(12) United States Patent
Blyumen

(10) Patent No.: US 10,963,135 B2
(45) Date of Patent: Mar. 30, 2021

(54) LANGUAGE-BASED MANIPULATION OF DATA VISUALIZATIONS

(71) Applicant: Oracle International Corporation, Redwood Shores, CA (US)

(72) Inventor: Julia Blyumen, Scotts Valley, CA (US)

(73) Assignee: Oracle International Corporation, Redwood Shores, CA (US)

( * ) Notice: Subject to any disclaimer, the term of this patent is extended or adjusted under 35 U.S.C. 154(b) by 73 days.

(21) Appl. No.: 16/354,386

(22) Filed: Mar. 15, 2019

(65) Prior Publication Data

US 2020/0293167 A1    Sep. 17, 2020

(51) Int. Cl.
  *G06F 16/248*  (2019.01)
  *G06F 3/0484*  (2013.01)
  (Continued)

(52) U.S. Cl.
  CPC ............ *G06F 3/0484* (2013.01); *G06F 3/167* (2013.01); *G06F 16/245* (2019.01);
  (Continued)

(58) Field of Classification Search
  None
  See application file for complete search history.

(56) References Cited

U.S. PATENT DOCUMENTS

| | | | | |
|---|---|---|---|---|
| 10,515,121 | B1 * | 12/2019 | Setlur | G10L 15/1815 |
| 2008/0005127 | A1 * | 1/2008 | Schneider | H04L 29/12594 |

(Continued)

FOREIGN PATENT DOCUMENTS

| | | |
|---|---|---|
| CN | 102164541 A | 8/2011 |
| CN | 104951070 A | 9/2015 |
| CN | 105117681 A | 12/2015 |
| CN | 106203293   | 12/2016 |

OTHER PUBLICATIONS

Wikipedia, "Conversational user interfaces," available online at <https://en.wikipedia.org/Wiki/Conversational_user_interfaces>, Jan. 13, 2019, 3 pages.

(Continued)

*Primary Examiner* — Rinna Yi
(74) *Attorney, Agent, or Firm* — Invoke

(57) ABSTRACT

Techniques for language-based manipulation of data visualizations are disclosed. A system presents a data visualization representing a multidimensional data set. The system receives user input including language associated with a particular interaction with the data visualization. The particular interaction is configured to manipulate presentation of one or more subsets of the multidimensional data set. The user input does not identify any particular subset of the multidimensional data set. The system determines that the interaction is applicable to two or more candidate subsets of the multidimensional data set and presents, as candidates for the particular interaction, the two or more candidate subsets. The system receives user input selecting a particular subset from candidates. Based on the user inputs, the system generates a complete command corresponding to the particular interaction. Based on the complete command, the system performs the particular interaction to manipulate, in the data visualization, presentation of the particular subset.

21 Claims, 24 Drawing Sheets

(51) Int. Cl.
G06F 16/245 (2019.01)
G06F 40/247 (2020.01)
G06F 40/289 (2020.01)
G06F 3/16 (2006.01)

(52) U.S. Cl.
CPC .......... *G06F 16/248* (2019.01); *G06F 40/247* (2020.01); *G06F 40/289* (2020.01)

(56) References Cited

U.S. PATENT DOCUMENTS

2017/0039281 A1* 2/2017 Venkata ................ G06F 16/248
2018/0032873 A1* 2/2018 Andersen ................ G06N 5/04

OTHER PUBLICATIONS

Gotz et al., "Characterizing Users' Visual Analytic Activity for Insight Provenance," IEEE Symposium on Visual Analytics Science and Technology, 2008, pp. 123-130.
Dhamdhere et al., "Analyza: Exploring Data with Conversation," Proceedings of the 22nd International Conference on Intelligent User Interfaces, 2017, pp. 493-504.
Srinivasan et al., Natural Language Interfaces for Data Analysis with Visualization: Considering What Has and Could Be Asked, Eurographics Conference on Visualization (EuroVis) 2017, 5 pages.
Setlur et al, Eviza: A Natural Language Interface for Visual Analysis, the 29th Annual Symposium, 13 pages, Oct. 2016.

* cited by examiner

FIG. 4

Interaction Vocabulary 400

| System Command | Synonym(s) |
|---|---|
| highlight | brush, select |
| focus on | filter to |
| show all | |
| compare to | add |
| view by | break down by, split by, switch dimension to |
| view by | group by, aggregate by, cluster by, sum up by |
| zoom in | |
| zoom out | |
| drill into | focus and zoom in on |
| swap | pivot, swap rows and columns |
| sort by | order by |
| go to | pan to, scroll to |
| show as | switch graph type to |
| switch to | switch measure to, show |

User Interface 500

User Interface 600

LANGUAGE-BASED MANIPULATION OF DATA VISUALIZATIONS

TECHNICAL FIELD

The present disclosure relates to data analytics. In particular, the present disclosure relates to visual data analytics.

BACKGROUND

Data analytics uses programmatic data processing techniques to extract meaningful information from raw data. In this context, "raw data" refers to data that, without further processing, does not supply some or all of the meaningful information provided by data analytics. Raw data may have undergone other processing prior to data analytics processing. For example, data generated by a business application (i.e., an application that supports one or more business operations such as sales, supply chain management, human resources, finance, customer relationship management, and/ or another business operation or combination thereof) may be considered raw data for data analytics purposes.

Data analytics may use many different kinds of programmatic data processing techniques. For example, data analytics may use one or more of: data filtering; aggregation; deduplication; trend analysis; statistical analysis; and/or another kind of processing technique or combination thereof. Data analytics may apply raw data to a machine learning model, statistical model, predictive model, and/or another kind of data processing model or combination thereof. Data analytics may produce meaningful information in many different formats. For example, data analytics may produce database entries, charts, graphs, tables, lists, alphanumeric text, and/or another format or combination thereof.

Visual data analytics supplies a graphical user interface that allows one or more users to view and interact with information produced by data analytics. The graphical user interface presents a data visualization that corresponds to a visual representation of the information produced by data analytics. The graphical user interface includes controls (i.e., interactive user interface elements) that allow a user to manually manipulate the presentation of elements in the data visualization. Depending on the complexity of the data visualization, the graphical user interface may include many controls. Alternatively or additionally, for a user to manipulate the presentation of elements in the data visualization, using the controls may require a sophisticated understanding of the underlying data analytics system.

Some computing devices are not as well-suited to using manual controls for visual data analytics. For example, mobile devices (e.g., mobile phones, tablets, etc.) typically have relatively small screens, with less space available to present data visualizations and/or manual controls. In addition, some computing devices lack a physical keyboard and/or mouse, thus limiting the modes of user interaction that are available to access controls. Due to such constraints, the functionality and/or controls available on mobile versions of visual data analytics tools may be limited, relative to versions that operate on non-mobile computing devices.

In computer systems, a multidimensional database represents data as a hypercube or multidimensional array. A multidimensional database has multiple dimensions. Each dimension corresponds to a different index into the data. As one example, a multidimensional database stores employee data. In this example, the different dimensions may include "Employee," "Department," and "Salary." The different dimensions may be visualized as the axes of a cube. A multidimensional database may have any number of dimensions. A particular data value within a multidimensional database may be referred to as an attribute. For example, for the dimension "Department," a multidimensional database may include the attributes "Sales," "Legal," "Human Resources," etc. Data analytics may use programmatic data processing techniques to extract meaningful information from data in a multidimensional database. A visual data analytics tool may supply a graphical user interface that allows one or more users to view and interact with that information.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 4 illustrates an example of an interaction vocabulary in accordance with one or more embodiments;

DETAILED DESCRIPTION

Figure 1:
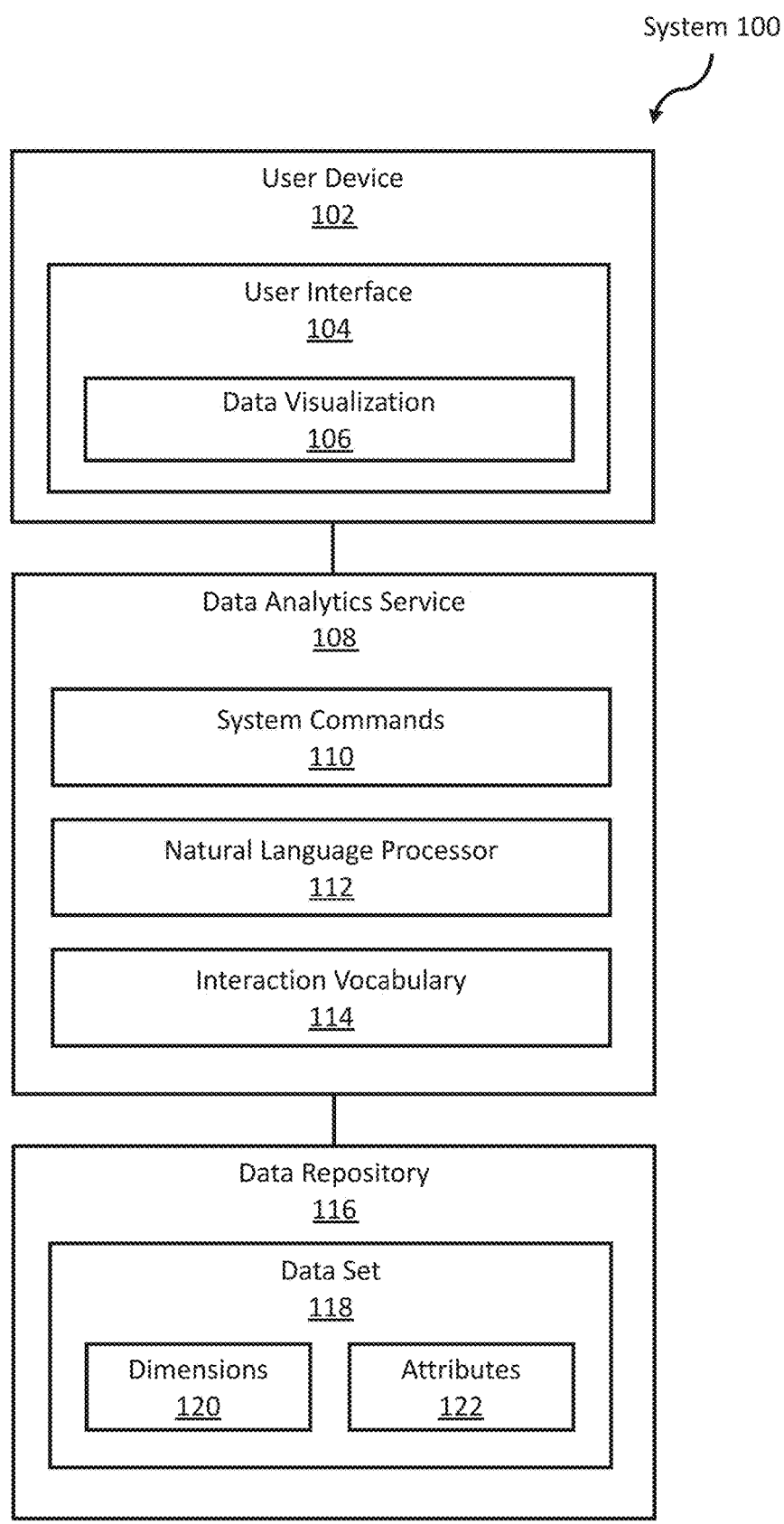
FIG. 1 illustrates a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. LANGUAGE-BASED MANIPULATION OF DATA VISUALIZATIONS
4. ILLUSTRATIVE EXAMPLES
   4.1 MULTIDIMENSIONAL DATABASE STRUCTURE
   4.2 INTERACTION VOCABULARY
   4.3 USER INTERFACES
5. MISCELLANEOUS; EXTENSIONS
6. HARDWARE OVERVIEW
7. COMPUTER NETWORKS AND CLOUD NETWORKS
8. MICROSERVICE APPLICATIONS

1. General Overview

One or more embodiments manipulate data visualizations. Given a current data visualization that represents a data set, a system receives language-based user input (i.e., text and/or speech) and, based on the user input, manipulates the presentation of one or more subsets of the data set in the data visualization. In an embodiment, the data set is a multidimensional data set and the system receives language-based user input to manipulate the presentation of dimensions, attributes, and/or measures presented in the data visualization.

In addition, one or more embodiments assist a user in providing the language-based user input. Given user input that identifies an interaction with the data visualization but does not identify any subset of the data set, the system determines that the interaction is applicable to one or more candidate subsets of the data set. The system receives additional user input selecting one or more of the candidate subset(s). Presenting candidate subsets for an interaction facilitates the language-based user input process, particularly on devices with limited functionality and/or controls (e.g., mobile devices with smaller screens and/or that lack a physical keyboard and mouse).

The data analytics system may determine that an interaction is applicable to a candidate subset of a data set in many different ways. In an embodiment, subsets of data that are already presented in the data visualization are candidates for the interaction. Alternatively or additionally, the data analytics system may identify one or more candidate subsets in metadata associated with the data visualization. Alternatively or additionally, the data analytics system may determine that the interaction is applicable to a particular type of data. The data analytics system may identify one or more candidate subsets of the data set as being of that particular type. Determining that an interaction is applicable to one or more particular candidate subsets may improve the relevancy of the candidates presented to the user, thus improving the speed and efficiency of the user experience.

One or more embodiments described in this Specification and/or recited in the claims may not be included in this General Overview section.

2. Architectural Overview

FIG. 1 illustrates a system 100 in accordance with one or more embodiments. As illustrated in FIG. 1, system 100 includes a user device 102, a data analytics service 108, a data repository 116, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, a data analytics service 108 refers to hardware and/or software configured to perform operations described herein for language-based manipulation of data visualizations. Examples of operations for language-based manipulation of data visualizations are described below. The data analytics service 108 may be configured to use programmatic data processing techniques to extract meaningful information from a data set 118 stored in a data repository 116. Alternatively or additionally, the data analytics service 108 may be configured to generate a data visualization 106 and transmit the data visualization to the user device 102 for presentation in a user interface 104. The data visualization 106 corresponds to a visual representation of information produced by data analytics.

In an embodiment, the user interface 104 includes controls (i.e., interactive user interface elements) that allow a user to manually manipulate the presentation of elements in the data visualization 106. More generally, the user interface 104 includes hardware and/or software configured to facilitate communications between a user and the data analytics service 108. The user interface 104 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of the user interface 104 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, the user interface 104 is specified in one or more other languages, such as Java, C, or C++.

In an embodiment, the data analytics service 108 includes system commands 110. The system commands 110 include commands that the data analytics service 108 executes to perform data analytics functions. Specifically, the system commands 110 include one or more commands that the data analytics service 108 executes to manipulate the presentation of one or more subsets of the data set 118 in the data visualization 106. As used herein, a "subset" of a data set refers to one or more discreet elements in the data set and/or one or more groupings thereof. Subsets of a multidimensional data set may include dimensions, attributes, measures, and/or any other subset of a multidimensional data set. Subsets of a relational database may include tables, rows, columns, cells, and/or any other subset of a relational database. Examples of commands for manipulating a data visualization are described below.

Alternatively or additionally, the system commands 110 may include one or more commands to query the data repository 116. For example, if the data repository 116 is a multidimensional database, the system commands 110 may include one or more commands to generate a multidimensional expression (MDX) query to be applied to the data repository 116. If the data repository 116 is a relational database, the system commands 110 may include one or more commands to generate a structured query language (SQL) query to be applied to the data repository 116. Alternatively or additionally, the data analytics service 108 may be configured to generate and/or execute a query as part of a system command 110 to manipulate the data visualization 106.

In an embodiment, the data analytics service 108 includes a natural language processor 112. A natural language processor 112 refers to hardware and/or software configured to perform operations described herein for extracting meaning from language-based user input (i.e., text and/or oral input). Specifically, the natural language processor 112 may be configured to receive language-based user input and map the language-based user input to one or more system commands 110. The natural language processor 112 may use natural language analysis (e.g., using a machine learning model trained to perform natural language analysis and/or another kind of natural language analysis or combination thereof) to interpret the language-based user input. Specifically, the natural language processor 112 may isolate relevant words and/or phrases in the language-based user input, based on context. The natural language processor 112 may use an interaction vocabulary 114 to determine whether a word or phrase corresponds to one or more system commands 110. In an embodiment, an interaction vocabulary 114 includes a mapping of natural language words and/or phrases to particular system commands 110. The data analytics service 108 may be configured to present candidates for applying the indicated system command(s) 110, as described below.

In an embodiment, a data repository 116 is any type of storage unit and/or device (e.g., a file system, database, collection of tables, or any other storage mechanism) for storing a data set 118. Further, a data repository 116 may include multiple different storage units and/or devices. The multiple different storage units and/or devices may or may not be of the same type or located at the same physical site. Further, a data repository 116 may be implemented or may execute on the same computing system as other components of the system 100. Alternatively or additionally, a data repository 116 may be implemented or executed on a computing system separate from one or more other components of system 100. A data repository 116 may be communicatively coupled to one or more other components of system 100 via a direct connection or via a network.

In an embodiment, the data repository 116 is a multidimensional database. Specifically, the data set 118 may be a multidimensional data set that includes one or more dimensions 120 and one or more attributes 122. Alternatively or additionally, the data set 118 may include one or more measures (not shown). An examples of a multidimensional database structure is described below.

In an embodiment, one or more components illustrated in FIG. 1 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

3. Language-Based Manipulation of Data Visualizations

Figure 2A:
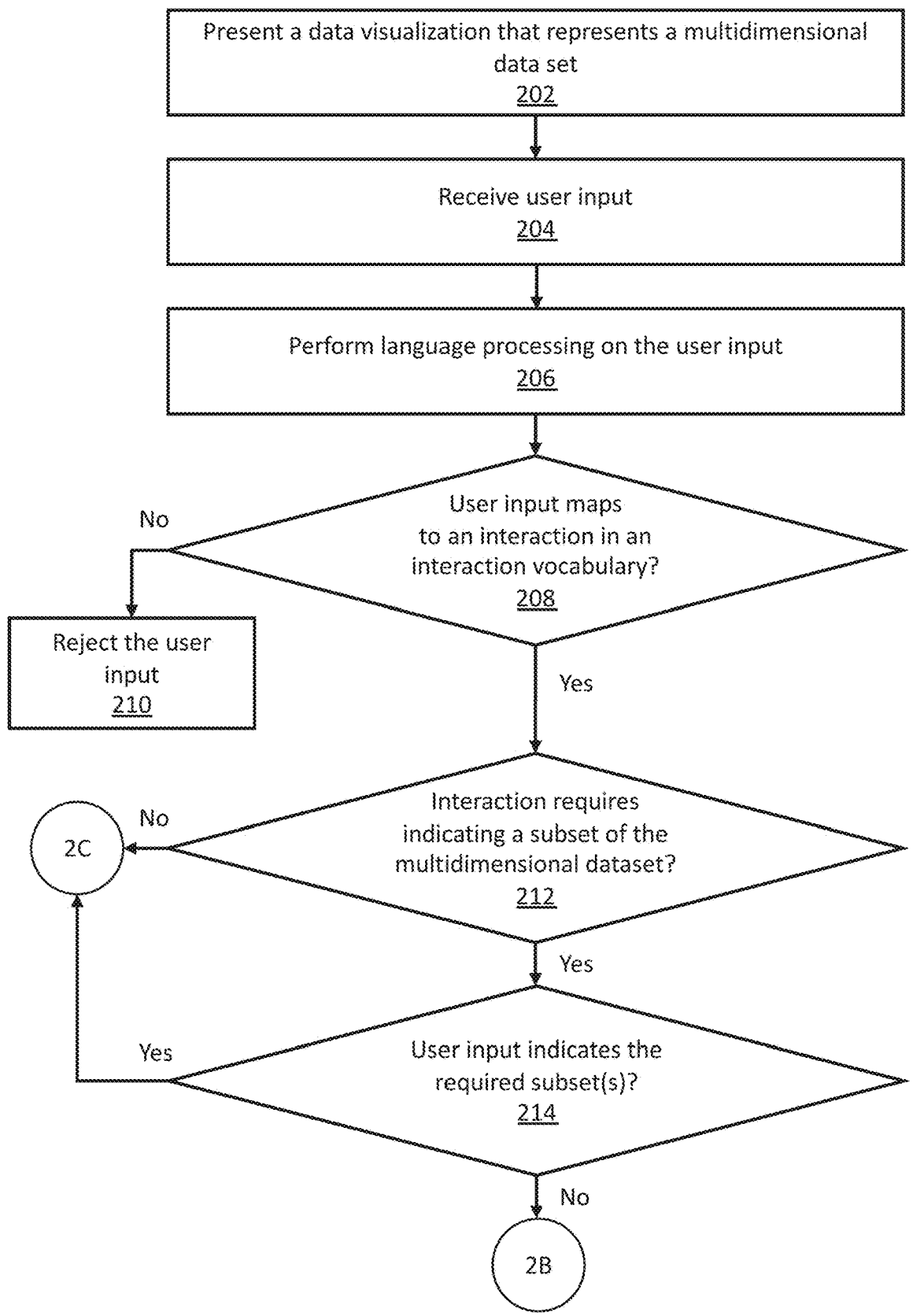
FIGS. 2A-2C illustrate a set of operations for language-based manipulation of data visualizations in accordance with one or more embodiments.
Figure 2B:
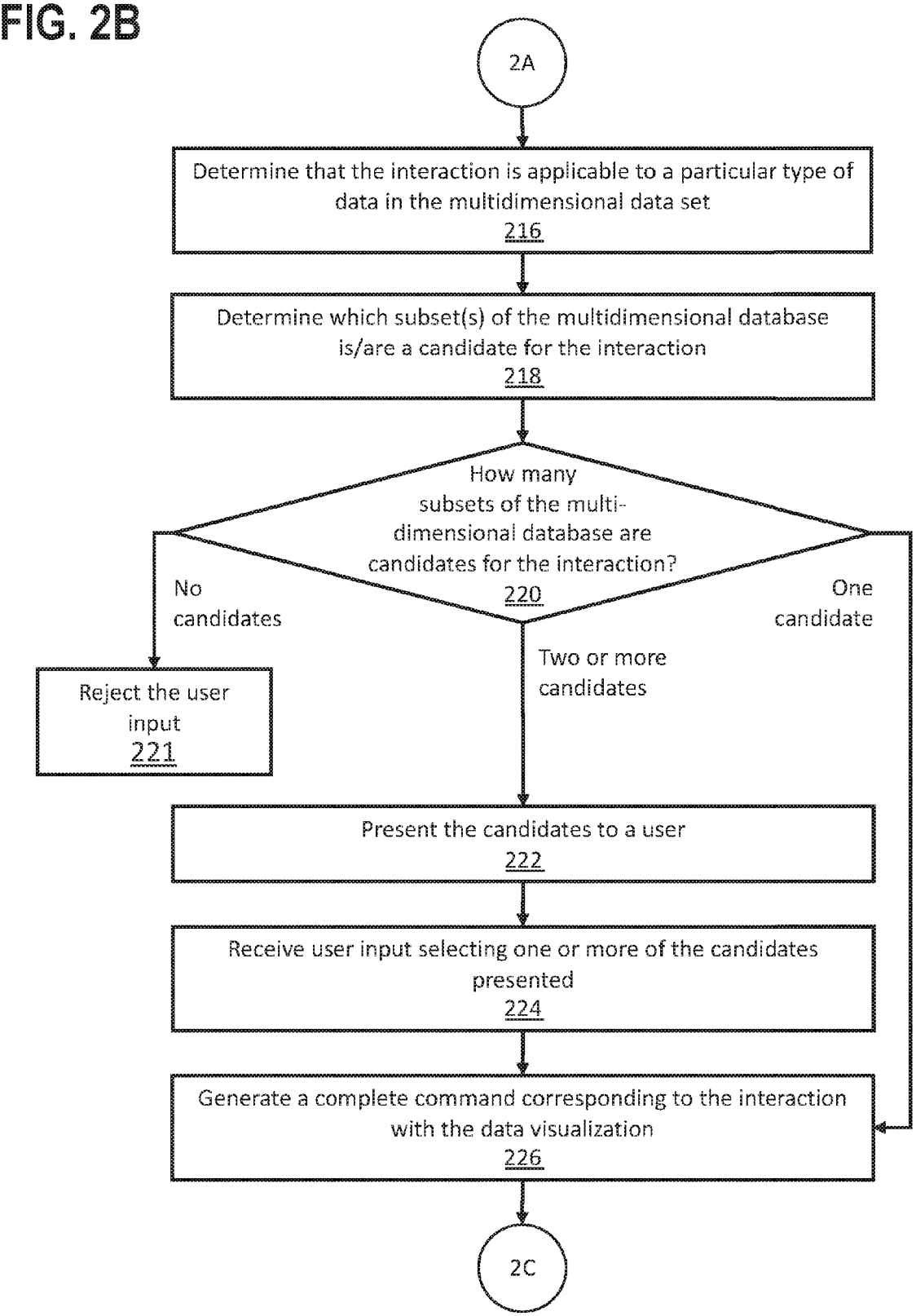
Figure 2C:
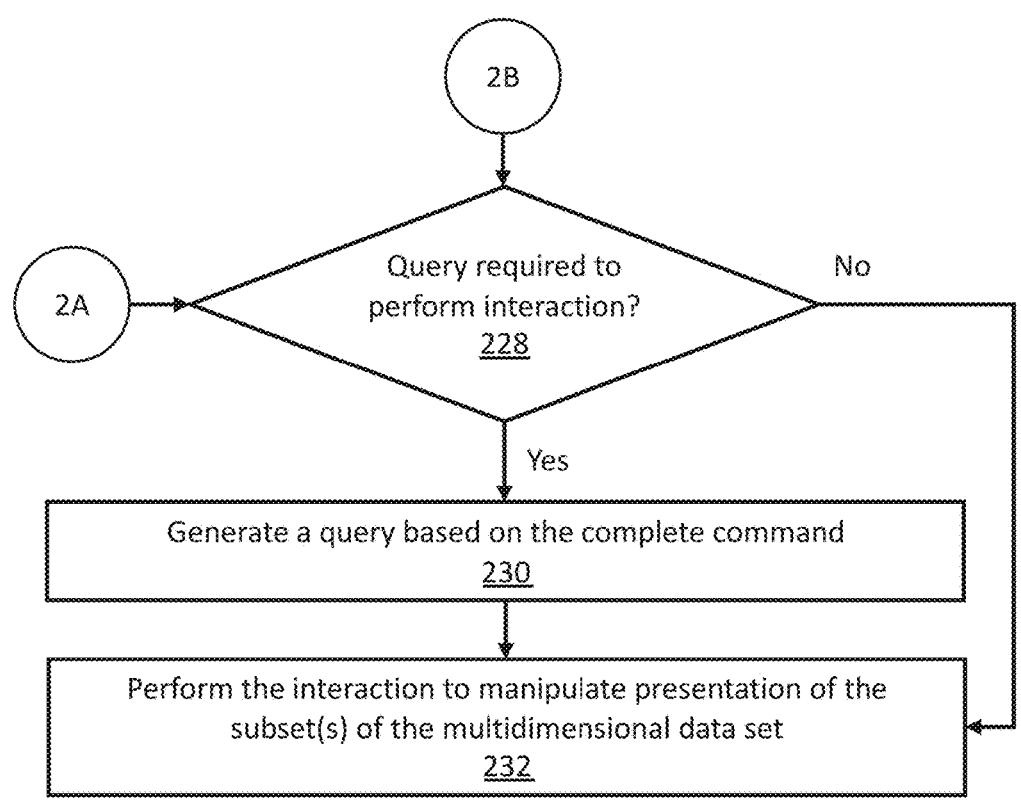

FIGS. 2A-2C illustrate a set of operations for language-based manipulation of data visualizations in accordance with one or more embodiments. One or more operations illustrated in FIGS. 2A-2C may be modified, rearranged, or omitted all together. Accordingly, the particular sequence of operations illustrated in FIGS. 2A-2C should not be construed as limiting the scope of one or more embodiments.

In an embodiment, a system (e.g., system 100 of FIG. 1) presents a data visualization that represents a multidimensional data set (Operation 202). To present the data visualization, a data analytics service may use programmatic data processing techniques to extract meaningful information from a data set (e.g., a multidimensional data set in a multidimensional database). The data analytics service generate a data visualization and transmit the data visualization to a user device for presentation in a user interface. Alternatively or additionally, embodiments may be practiced using a data set in a relational database and/or another kind of data set that is not a multidimensional data set.

In an embodiment, the system receives user input (Operation 204). The user input may be language-based user input, i.e., text-based and/or oral input. For example, a user may type the input using a physical or virtual keyboard. Alternatively or additionally, a user may speak the input into a microphone. Alternatively or additionally, a user may select a user interface command corresponding to a particular user input.

In an embodiment, the system performs natural language processing on the user input (Operation 206). Natural language processing uses natural language analysis to interpret language-based user input. Natural language analysis isolates relevant words and/or phrases in the language-based user input, based on context. Specifically, natural language analysis may isolate one or more verbs in the language-based user input. The verb(s) may correspond to one or more interactions that manipulate the data visualization. Alternatively or additionally, natural language analysis may isolate one or more nouns in the language-based user input. The noun(s) may correspond to one or more subsets of the multidimensional data set, to which the interation(s) is/are to be applied.

In an embodiment, the system determines whether the user input maps to an interaction in an interaction vocabulary (Operation 208). Specifically, the system may determine whether a verb in the user input corresponds to a system command, or a synonym of a system command, in an interaction vocabulary. If the user input does not map to an interaction in the interaction vocabulary, then the system may reject the user input (Operation 210). The system may present an error message indicating the that the user input does not indicate any recognized interaction. Alternatively or additionally, the system may present a message that suggests one or more other valid interactions.

In an embodiment, the user input indicates an interaction that manipulates the presentation of a subset of a multidimensional data set in the data visualization. The interaction may manipulate the presentation of a dimension of a multidimensional data set. Alternatively or additionally, the interaction may manipulate the presentation of an attribute in a multidimensional data set. Alternatively or additionally, the interaction may manipulate the presentation of a measure in a multidimensional data set. Alternatively or additionally, the interaction may manipulate a presentation mode of the data visualization. Examples of interactions that manipulate the presentation of a subset of a multidimensional data set are described below.

In an embodiment, some interactions do not require a user to indicate any subset (e.g., dimension, attribute, or measure) of the multidimensional data set to which to apply the interaction. For example, FIG. 4 illustrates an example of an interaction vocabulary that includes the system command "swap." In this example, the "swap" command changes the precedence of dimensions presented in the data visualization. If the data visualization presents regions broken down by product, the "swap" command manipulates the data visualization to instead present products broken down by region. Because the "swap" command knows which dimensions to swap based on context (i.e., the dimensions presented in the current data visualization), the "swap" command does not require a user to indicate which dimensions to swap. In contrast, in FIG. 4, the "highlight" command highlights a particular attribute in the data visualization. In an embodiment, the "highlight" command requires a user to indicate an attribute to highlight. In an embodiment, the system determines whether the interaction specified by the user input requires indicating a subset of the multidimensional data set (Operation 212). If the interaction does require indicating a subset of the multidimensional data set, then the system determines whether the user input indicates the required subset(s) (Operation 214). If the user input does not indicate the required subset(s), then the system proceeds to identify one or more candidate subsets for the interaction, as follows.

In an embodiment, the system determines that the interaction is applicable to a particular type of data in the multidimensional data set (Operation 216). Determining the particular type of data to which the interaction applies may be based on one or more words or phrases in the user input. For example, the word "country" is generally associated with locations and the word "year" is generally associated with times. Alternatively or additionally, determining the particular type of data to which the interaction applies may be based on the interaction itself, i.e., which types of data the interaction is configured to manipulate in the data visualization.

For example, FIG. 4 illustrates an example of an interaction vocabulary that includes the system command "compare to." In this example, the "compare to" command presents a comparison of data associated with two or more attributes. If the user input includes the phrase "compare to" and a location-based attribute is currently highlighted in the data visualization (e.g., the "Midwest" region attribute), then the system may determine that the interaction is applicable to location-based attributes. In an embodiment, determining the particular type of data to which the interaction applies helps the system present relevant candidate subsets for the interaction.

In an embodiment, the system determines which subset(s) of the multidimensional data set is/are a candidate for the interaction (Operation 218). Determining that a subset is a candidate for the interaction may be based on a type of data to which the interaction is applicable (e.g., as determined in Operation 216 above). The system may determine which subsets (e.g., dimensions, attributes, and/or measures) are of that particular data type. The system may identify subsets that are of the applicable data type as candidate subsets for the interaction.

Alternatively or additionally, determining that a subset is a candidate for the interaction may be based on which subset(s) is/are currently presented in the data visualization. For example, FIG. 4 illustrates an example of an interaction vocabulary that includes the system command "highlight." In this example, the "highlight" command highlights a particular attribute in the data visualization. The system may determine that only attributes that are currently presented in the data visualization are candidates for the "highlight" command. In general, if an interaction is configured to manipulate presentation of a subset that is already presented in the data visualization, then the system may determine that only those subsets that are already presented are candidates for the interaction.

Alternatively or additionally, to determine that a subset is a candidate for the interaction, the system may determine that the subset is represented in metadata associated with the data visualization. Metadata associated with the data visualization may indicate which subset(s) of the multidimensional data set is/are available to manipulate in the data visualization. Alternatively or additionally, metadata associated with the data visualization may indicate relationships between different subsets of the multidimensional data set. In one example, the metadata associated with the multidimensional data set includes a representation of a data hierarchy for the multidimensional data set. The system may inspect the data hierarchy to determine which subset(s) is/are candidates for the interaction. A subset that is represented in metadata associated with the multidimensional data set may be a subset that is not currently presented in the data visualization.

In an embodiment, the system determines how many subsets of the multidimensional data set are candidates for the interaction (Operation 220), i.e., how many subsets the system has identified as candidates. In an embodiment, if the system does not identify any candidate subsets, then the system rejects the user input (Operation 221). The system may present an error message indicating that the interaction specified in the user input is not applicable to any available subsets of the multidimensional data set. Alternatively or additionally, the system may present a message that suggests an alternative interaction for which one or more candidate subsets are available. In an embodiment, if the system identifies only one candidate subset, then the system proceeds to generate a complete command corresponding to the interaction with the data visualization, using the single candidate subset (Operation 226, described in further detail below). The system may first present the single candidate subset to the user and/or prompt the user to indicate whether to proceed using the identified subset.

In an embodiment, if the system identifies two or more candidate subsets, then additional user input may be required to select which subset to use for the interaction. In an embodiment, the system presents the candidates to a user (Operation 222). The system may present the candidates in many different ways. The system may present the candidates in a list, as illustrated in the examples described below. Alternatively or additionally, the system may present the candidates in audio format, using a speaker in a user device to "speak" the names of the candidates. In an embodiment, in response to presenting the candidate subsets, the system receives user input selecting one or more of the candidates presented (Operation 224).

In an embodiment, after the system has identified one or more subsets of the multidimensional data set to use for the interaction (e.g., if only one candidate subset is identified and/or the system receives user input selecting one or more candidate subsets), the system generates a complete command corresponding to the interaction with the data visualization (Operation 226). The complete command identifies both the interaction and the subset(s) of the multidimensional data set to which the interaction is to be applied. If the interaction does not require identifying a particular subset (e.g., as determined in Operation 212, described above), then it may not be necessary to generate a complete command.

In an embodiment, the system determines whether a query is required to perform the interaction (Operation 228). A query may be required whether or not the interaction requires identifying a particular subset of the multidimensional data set. A query may be required if the interaction requires data that was not already retrieved in connection with the currently presented data visualization. For example, a query may be required if the interaction presents data from a dimension that is not currently presented in the data visualization and that was not retrieved when preparing the currently presented data visualization. In response to determining that a query is required to perform the interaction (Yes in Operation 228), the system may generate the query based on the complete command (Operation 230).

In an embodiment, one or more interactions that manipulate presentation of one or more subsets of the multidimensional data set in the data visualization are performed without querying the multidimensional database. An interaction may manipulate presentation of data that is already presented in the data visualization. Alternatively or additionally, an interaction may manipulate presentation of data that was previously retrieved, even if the data is not currently presented in the data visualization. In one example, a data visualization presents data associated with sales regions. In this example, "region" is a dimension of the multidimensional data set. In the process of preparing the data visualization, the system queried the multidimensional database to retrieve data associated with different states in each sales region. In this example, "state" is a subdimension of the "region" dimension. To perform an interaction that presents data associated with the different states, the system may use the data that was already retrieved, without querying the multidimensional database again.

In an embodiment, the system performs the interaction to manipulate presentation of one or more subsets of the multidimensional data set (Operation 232). As a result of the interaction, the subset(s) is/are presented differently than before the interaction. Data associated with a particular subset may be filtered, hidden, revealed, highlighted, sorted, aggregated, broken out into component data, and/or another manipulation of combination thereof. An interaction may manipulate the presentation of a subset of a multidimensional data set in many different ways. Examples of interactions that manipulate the presentation of a subset of a multidimensional data set are described below.

4. Illustrative Examples

Detailed examples are described below for purposes of clarity. Components and/or operations described below should be understood as specific examples which may not be applicable to certain embodiments. Accordingly, components and/or operations described below should not be construed as limiting the scope of any of the claims.

4.1 Multidimensional Database Structure

Figure 3A:
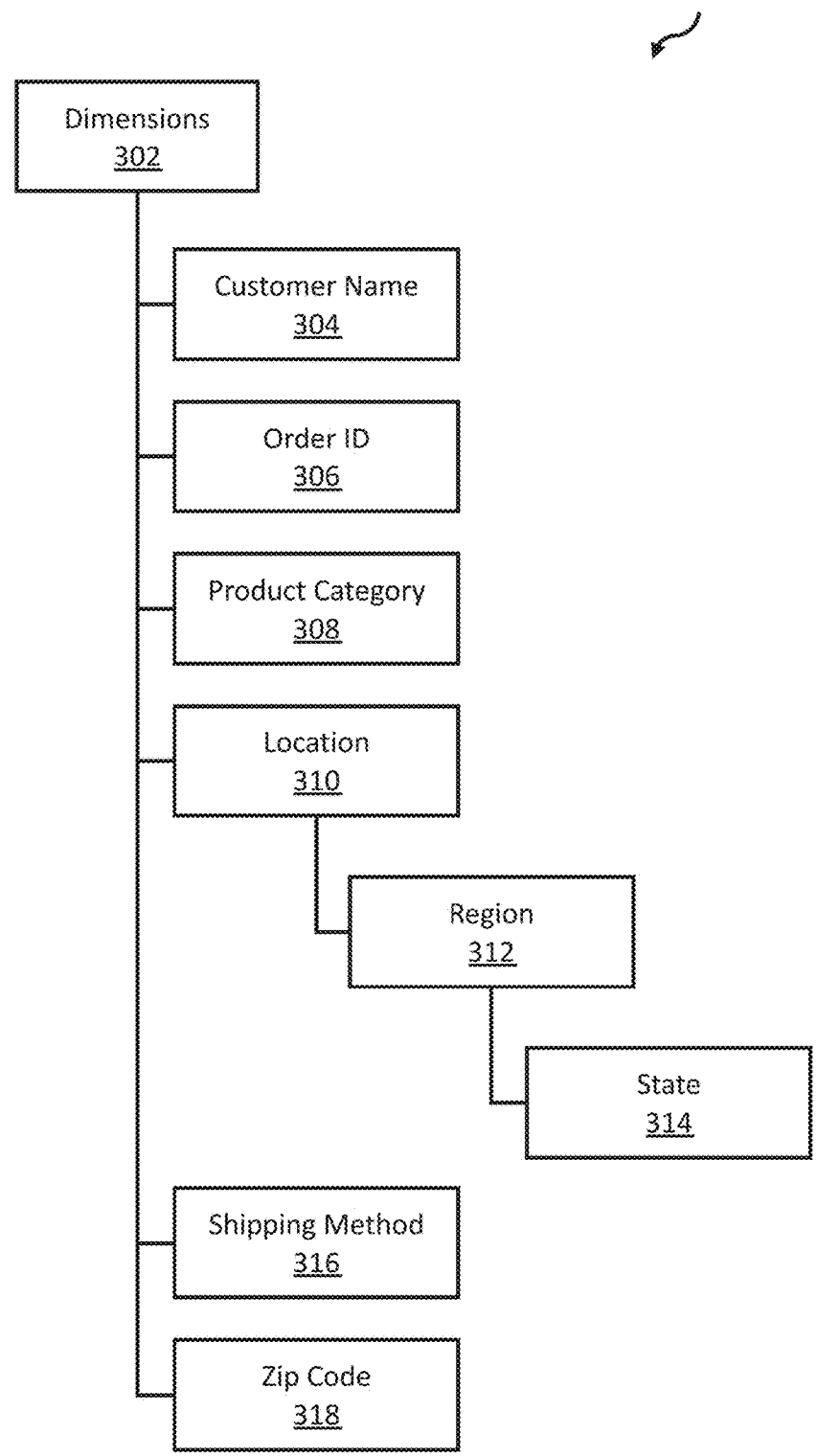
FIGS. 3A-3B illustrate an example of a multidimensional database structure in accordance with one or more embodiments.
Figure 3B:
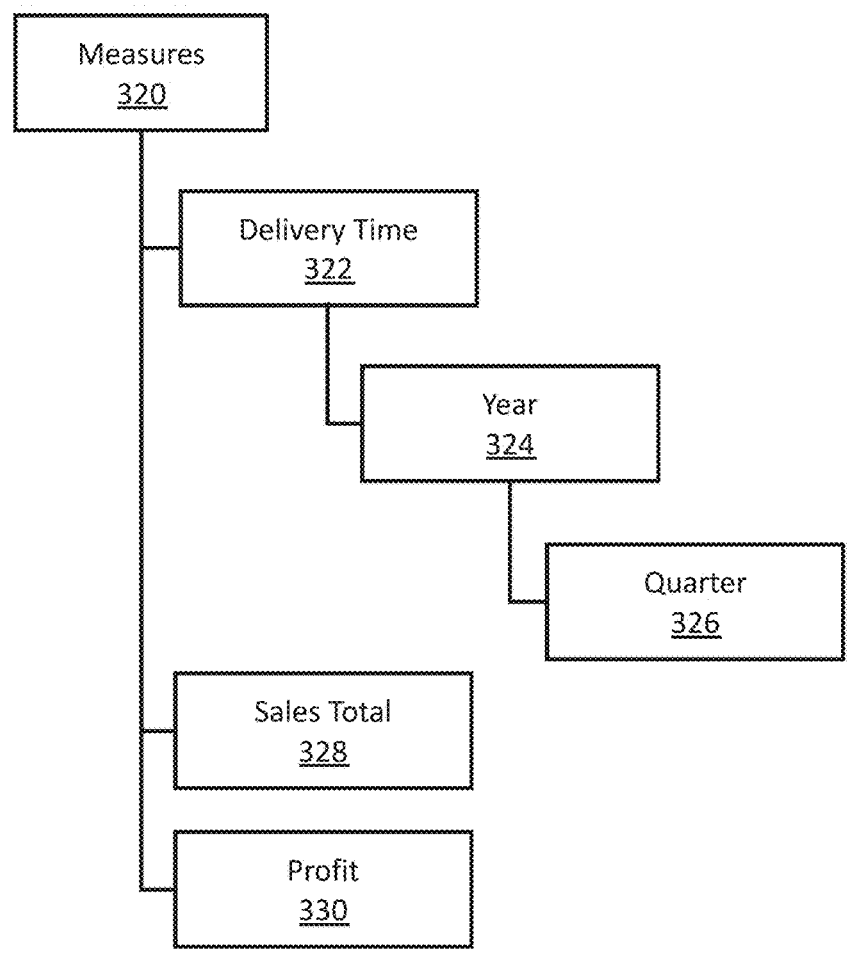

FIGS. 3A-3B illustrate an example of a multidimensional database structure 300 in accordance with one or more embodiments. In this example, as illustrated in FIG. 3A, the multidimensional database structure 300 includes multiple top-level dimensions 302: customer name 304; order identifier (ID) 306; product category 308; location 310; shipping method 316; and zip code 318. In addition, the multidimensional database structure 300 includes a hierarchy of subdimensions. Region 312 is a dimension that is also a subdimension of location 310. State 314 is a dimension that is also a subdimension of location 310. As used herein, the term "dimension" may refer to a top-level dimension and/or a subdimension.

In an embodiment, a multidimensional database includes one or more measures 320. As used herein, a measure is a particular grouping of homogenous, quantifiable data. Each measure has a corresponding value. For example, a "profit" measure may have a value of "$35,000." In this example, as illustrated in FIG. 3B, the multidimensional database structure 300 includes multiple top-level measures: delivery time 322; sales total 328; and profit 330. In addition, the multidimensional database structure 300 includes a hierarchy of sub-measures. Year 324 is a measure that is also a sub-measure of delivery time 322. Quarter 326 is a measure that is also a sub-measure of year 324. As used herein, the term "measure" may refer to a top-level measure and/or a sub-measure.

4.2 Interaction Vocabulary

As described above, when the system receives language-based user input, the system may use an interaction vocabulary to determine whether the user input maps to a system command. FIG. 4 illustrates an example of an interaction vocabulary 400 in accordance with one or more embodiments. As illustrated in FIG. 4, a system command may have one or more synonyms. To determine whether user input maps to a system command, the system may determine whether the user input includes either the system command itself or a synonym thereof. While FIG. 4 illustrates various words and terms corresponding to particular interactions, many different words and/or terms may be used to describe many different interactions.

In an embodiment, an interaction shows all attributes of one or more particular dimensions. In the example illustrated in FIG. 4, the interaction vocabulary 400 includes the system command "show all," without any synonyms. Given the user input "show all" and a particular dimension, the system may show all attributes of that dimension. For example, given a multidimensional data set with a "region" dimension, the system may receive user input to "show all regions." In an embodiment, the user input includes selecting from a presented set of candidate dimensions.

In an embodiment, an interaction breaks down data within a currently presented dimension by a particular subdimension, i.e., disaggregates data to the level of the particular subdimension. In addition, the interaction may present data associated with the subdimension that was not presented before the interaction. In the example illustrated in FIG. 4, the interaction vocabulary includes the system command "view by," with the synonyms "break down by," "split by," and "switch dimension to." Given the user input "view by" and a particular subdimension, the system may break down data within the currently presented dimension by the specified subdimension, without requiring additional user input to select any dimension. For example, given a current data visualization that presents sales data for a particular state, the system may receive user input to "view by county," to break down the sales data by counties in that state. In an embodiment, the user input includes selecting from a presented set of candidate dimensions.

In an embodiment, if the user input is to "view by" a dimension that is not a subdimension of the currently presented dimension, the system may add a dimension to the current data visualization, to allow the system to break down the data by the specified dimension. For example, a user may request to "view by region" (a location dimension), when the current data visualization presents sales data aggregated by year (a time dimension). In this example, the system may retain both the time dimension and the location dimension in the current data visualization. Alternatively, the system may replace the time dimension with the location dimension. To decide whether to retain or replace the currently presented dimension, the system may prompt the user for a preference, reference a system rule and/or setting, use machine learning derived from previous usage patterns, and/or decide whether to retain or replace the currently presented dimension in another way or combination thereof. A user may subsequently use a "swap" dimension, described herein, to swap the dimensions.

In an embodiment, an interaction aggregates data by a particular dimension. In the example illustrated in FIG. 4, the interaction vocabulary 400 includes the system command "view by," with the synonyms "group by," "aggregate by," "cluster by," and "sum up by." Given the user input "view by" and a particular dimension, the system may aggregate data by that dimension. For example, a current data visualization may present data aggregated by state. The system may receive user input to instead "view by product." As another example, the system may receive user input to "view by region," i.e., further aggregate the state-specific data by region. In an embodiment, the user input includes selecting from a presented set of candidate dimensions.

As illustrated in FIG. 4, the interaction vocabulary 400 includes two different "view by" commands. In general, an interaction vocabulary may include multiple commands with the same name. In an embodiment, the system is configured to disambiguate between the commands. Specifically, the system may determine which command to use based on additional user input and/or contextual data. In the examples above, the system may determine which "view by" command to apply based on the dimension specified in the user input.

In an embodiment, an interaction sorts data by a particular dimension. In the example illustrated in FIG. 4, the interaction vocabulary 400 includes the system command "sort by," with the synonym "order by." Given the user input "sort by" and a particular dimension, the system may sort data by that dimension. For example, a current data visualization may present data sorted by region. The system may receive user input to instead "sort by state." In an embodiment, the user input includes selecting from a presented set of candidate dimensions.

In an embodiment, an interaction swaps the precedence of two dimensions in the data visualization. In the example illustrated in FIG. 4, the interaction vocabulary 400 includes the system command "swap," with the synonyms "pivot" and "swap rows and columns." Given the user input "swap," the system may swap the precedence of two dimensions currently presented in the data visualization, without requiring additional user input to select a dimension. For example the system may receive user input to "swap" from viewing regions broken down by products to viewing products broken down by regions.

In an embodiment, an interaction breaks down data within a currently presented dimension by its most immediate subdimension, i.e., disaggregates data to the level of the most immediate subdimension. In addition, the interaction may present data associated with the subdimension that was not presented before the interaction. In the example illustrated in FIG. 4, the interaction vocabulary 400 includes the system command "zoom in." Given the user input "zoom in," the system may break down data within the currently presented dimension by its most immediate subdimension, without requiring additional user input to select any dimension. For example, given a current data visualization that presents sales data for a particular region, the system may receive user input to "zoom in," to break down the sales data by states in that region.

In an embodiment, an interaction removes a breakdown of data by a particular subdimension, i.e., aggregates data by the most immediate parent dimension. In the example illustrated in FIG. 4, the interaction vocabulary 400 includes the system command "zoom out." Given the user input "zoom out," the system may remove the breakdown of data, without requiring additional user input to select any dimension. For example, given a data visualization that presents sales data for multiple states in a region, the system may receive user input to "zoom out" to aggregate the data by region.

In an embodiment, an interaction sorts data by a particular measure. In the example illustrated in FIG. 4, the interaction vocabulary 400 includes the system command "sort by," with the synonym "order by." Given the user input "sort by" and a particular measure, the system may sort data by that measure. For example, a current data visualization may present data sorted by name. The system may receive user input to instead "sort by profit." In an embodiment, the user input includes selecting from a presented set of candidate measures. If the system supports sorting by both dimensions and measures, the system may present a set of candidate dimensions and measures. Alternatively or additionally, the system may be configured to present either candidate dimensions or candidate measures, depending on a context of the user input. In general, the system may support commands that have the same name and/or synonym, and may rely on user input and/or context to determine which command to use.

In an embodiment, an interaction switches from viewing data aggregated by one measure to viewing data aggregated by another measure. In the example illustrated in FIG. 4, the interaction vocabulary 400 includes the system command "switch to," with the synonyms "switch measure to" and "show." Given the user input "switch to" and a particular measure, the system may switch to viewing data aggregated by that measure. For example, a current data visualization may present sales data aggregated by profit. The system may receive user input to instead "switch to sales," to view the data aggregated by number of sales. In an embodiment, the user input includes selecting from a presented set of candidate measures.

In an embodiment, an interaction highlights one or more attributes. In this context, "highlighting" may mean shading, underlining, bolding, italicizing, and/or another manipulation or combination thereof to make the specified attribute(s) more visually prominent in the data visualization. In the example illustrated in FIG. 4, the interaction vocabulary 400 includes the system command "highlight," with the synonyms "brush" and "select." Given the user input "highlight" and a particular attribute, the system may highlight that attribute. For example, a current data visualization may present data for multiple states in a Northeast sales region. The system may receive user input to "highlight Massachusetts," to highlight the data for that state. In an embodiment, the user input includes selecting from a presented set of candidate attributes.

In an embodiment, an interaction removes the presentation of data for all attributes other than a particular attribute. In the example illustrated in FIG. 4, the interaction vocabulary 400 includes the system command "focus on," with the synonym "filter to." Given the user input "focus on" and a particular attribute, the system may remove the presentations of data for all attributes other than that attribute. For example, a current data visualization may present data for multiple states in a Northeast sales region. The system may receive user input to "focus on Massachusetts," to remove the presentation of data for all but that state. In an embodiment, the user input includes selecting from a presented set of candidate attributes.

In an embodiment, an interaction presents a comparison of data associated with two or more attributes. In the example illustrated in FIG. 4, the interaction vocabulary 400 includes the system command "compare to," with the synonym "add." Given the user input "compare to" and a particular attribute, the system may present a comparison of (a) data associated with a currently presented attribute with (b) data associated with the particular attribute. For example, a current data visualization may present data for sales in Massachusetts. The system may receive user input to "compare to New York," to present a comparison of data associated with Massachusetts and New York. In an embodiment, the user input includes selecting from a presented set of candidate attributes.

In an embodiment, an interaction may be a composite interaction, i.e., a single interaction combines the functionalities of two or more other interactions. For example, a single interaction may both (a) remove the presentation of data for all attributes other than a particular attribute (e.g., "focus on," described above) and (b) break down data within a currently presented dimension by its most immediate subdimension (e.g., "zoom in," described above). This composite interaction effectively presents one or more sub-attributes of the specified attribute, at the level of the most immediate subdimension. In the example illustrated in FIG. 4, the interaction vocabulary 400 includes the system command "drill into," with the synonym "focus and zoom in on." Given the user input "focus and zoom in on" and a particular attribute, the system may (a) remove the presentation of data for all attributes other than that attribute and (b) present one or more sub-attributes of that attribute. For example, a current data visualization may present data for multiple sales regions. The system may receive user input to "drill into Midwest," to remove the presentation of data for all regions other than Midwest and break down the sales data by states in that region. In an embodiment, the user input includes selecting from a presented set of candidate attributes.

In an embodiment, when viewing data only for a single attribute (e.g., "focus on," described above), an interaction may instead present data only for a different attribute. In the example illustrated in FIG. 4, the interaction vocabulary 400 includes the system command "go to," with the synonym "scroll to." Given the user input "go to" and a particular attribute, the system may remove the presentation of data the current attribute and instead data for the specified attribute. For example, a current data visualization may present sales data for the year 2018. The system may receive user input to "go to 2019," to remove the presentation of sales data for the year 2018 and instead present sales data for the year 2019. In an embodiment, the user input includes selecting from a presented set of candidate attributes.

In an embodiment, an interaction does not operate on a specific subset of a multidimensional data set but nonetheless manipulates how data is presented in a data visualization. In the example illustrated in FIG. 4, the interaction vocabulary 400 includes the system command "show as," with the synonym "switch graph type to." Given the user input "show as," the system may present a set of candidate visualization modes (e.g., pie chart, table, etc.). The system may receive user input selecting one of the visualization modes to show the data visualization as that mode.

4.3 User Interfaces

Figure 5A:
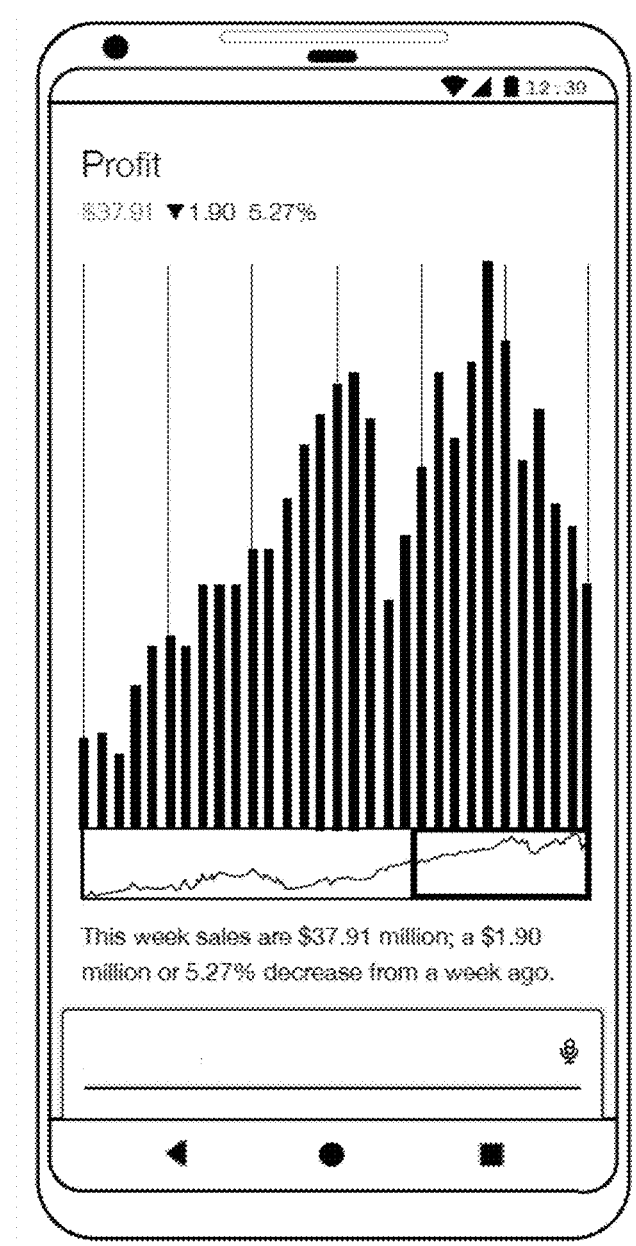
FIGS. 5A-5I illustrate an example in accordance with one or more embodiments.

FIGS. 5A-5I illustrate an example in accordance with one or more embodiments. Specifically, FIGS. 5A-5I illustrate an example of language-based manipulation of a data visualization, using a user interface 500 on a mobile device. In FIG. 5A, the user interface 500 presents a data visualization that charts profit over time. The input box at the bottom of the screen shows language-based user input that has been supplied to the user interface 500. In FIG. 5A, the input box is empty. Alternatively, the input box may show default text, such as "type something," "try 'group by location,'" and/or some other default text. If a user taps the input box, the system presents a virtual keyboard. In addition, the system may receive user input via a microphone in the mobile device.

Figure 5B:
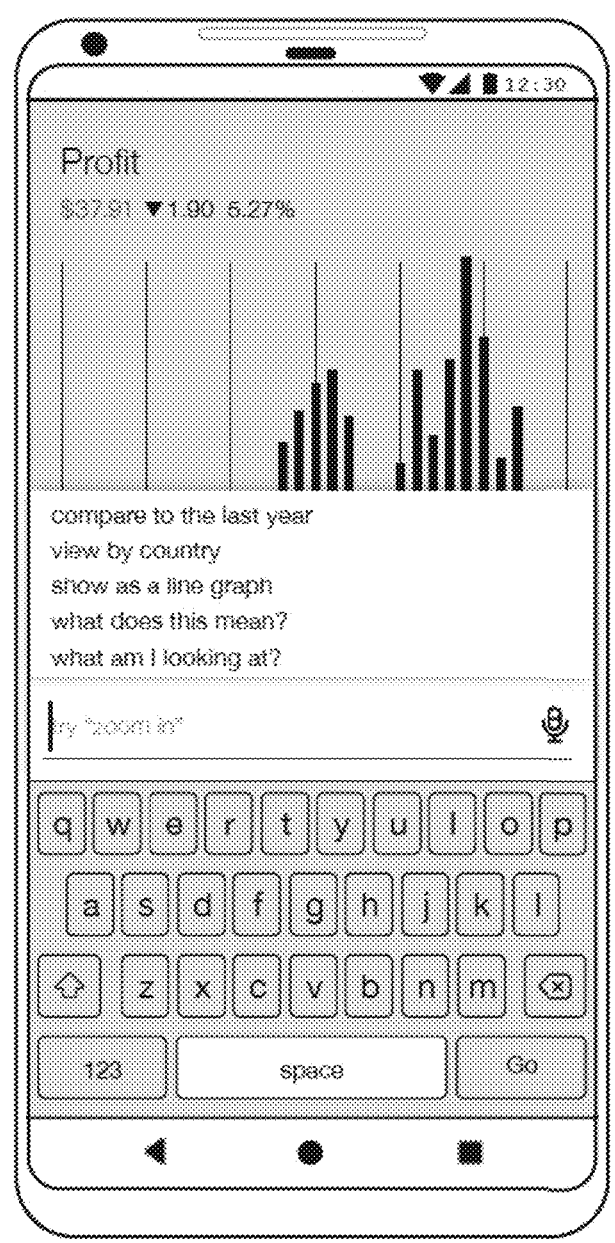
Figure 5C:
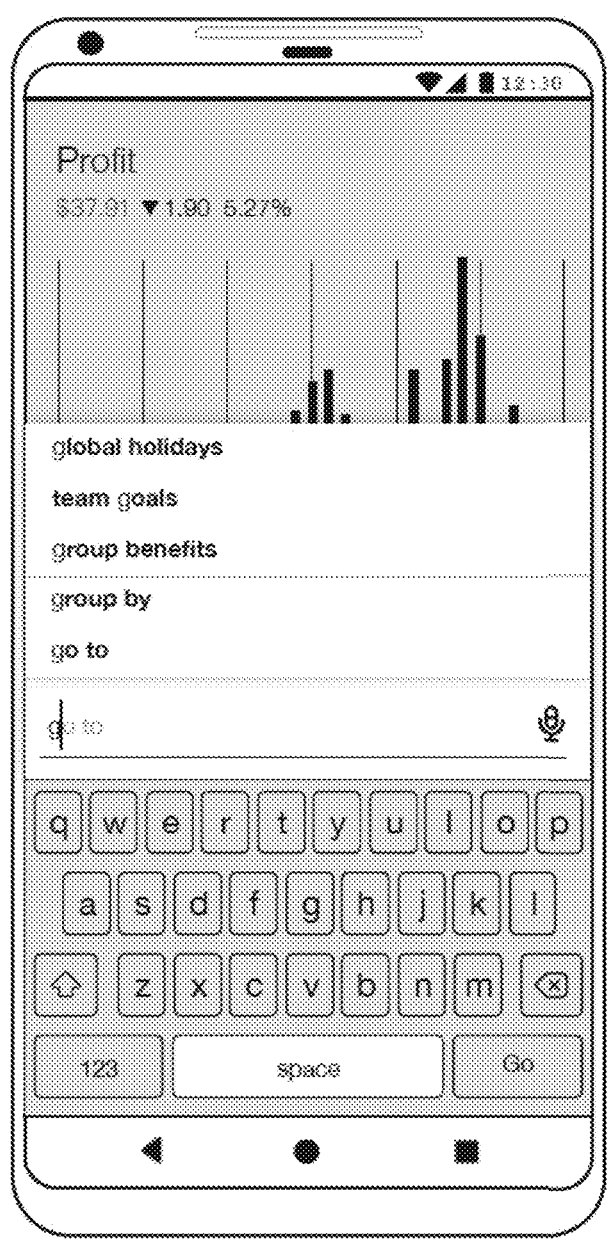
Figure 5D:
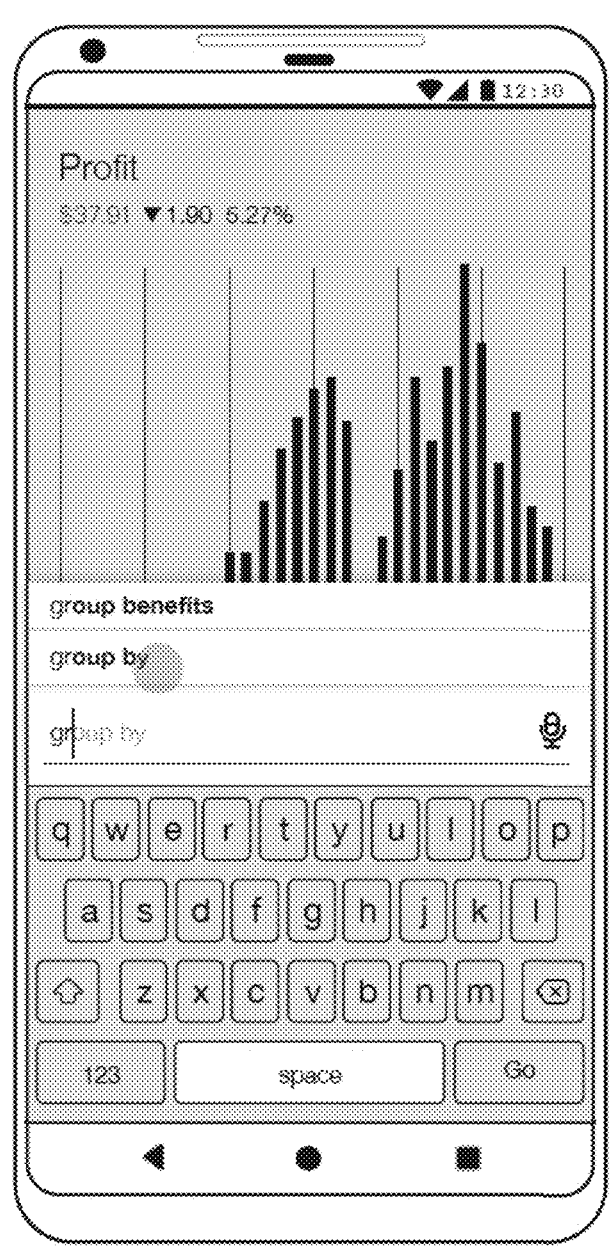

In FIG. 5B, responsive to a user tapping the input box, the system presents a virtual keyboard. Above the input box, the system presents a list of suggestions and help topics. The list of suggestions may include default suggestions based on context, and/or may include a history of previous user inputs. In FIG. 5C, the system receives user input corresponding to the letter "g." In the list above the input box, the system presents suggested inputs that include words starting with the letter "g." In FIG. 5D, the system receives additional user input corresponding to the letter "r" and narrows down the list of suggestions accordingly. In this example, the system receives user input selecting (e.g., by speaking or tapping on the screen) the interaction "group by" from the list of suggestions. In the example interaction dictionary of FIG. 4, describe above, "group by" is a synonym of (i.e., maps to) the system command "view by."

Figure 5E:
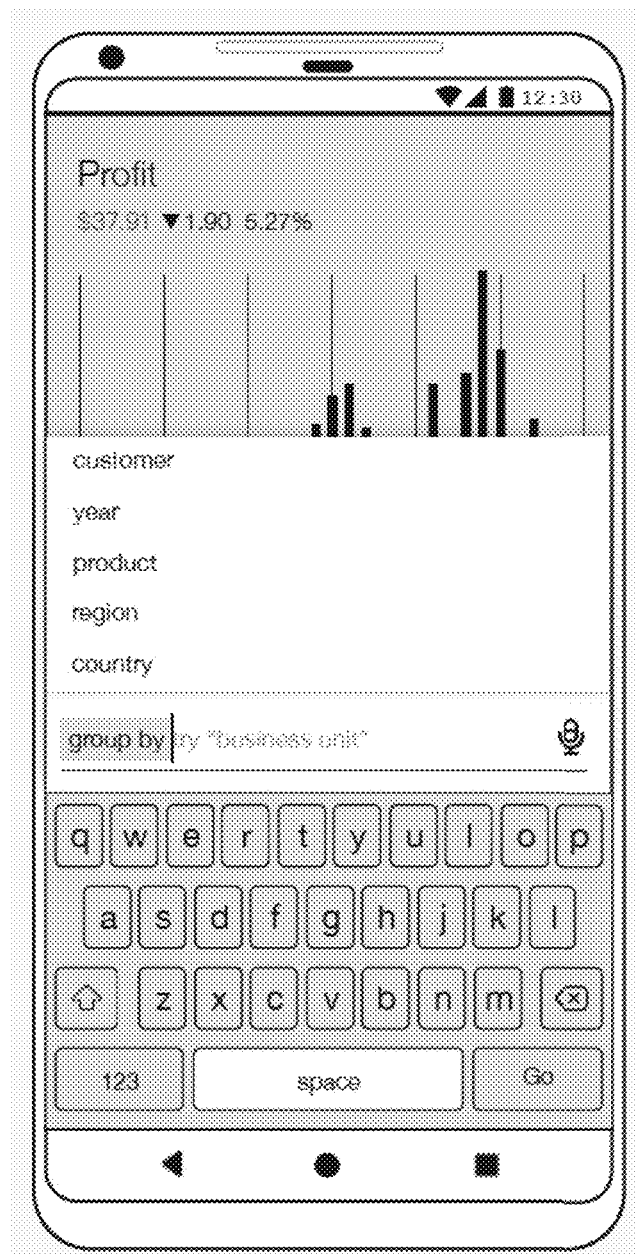
Figure 5F:
Figure 5G:
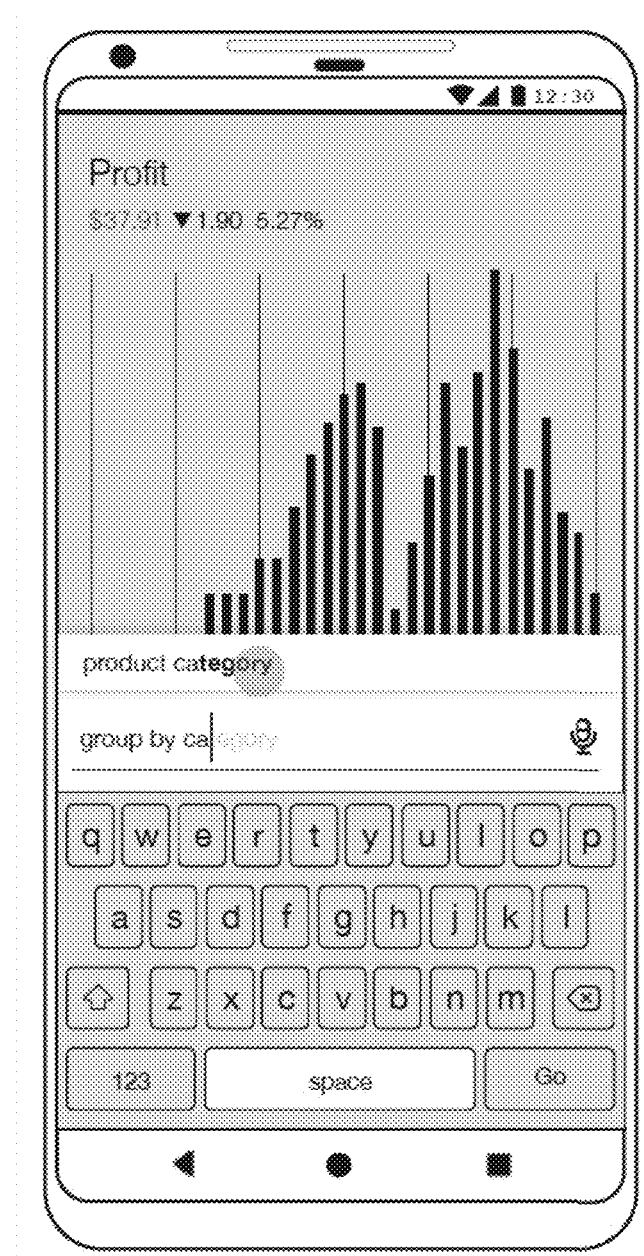

In FIG. 5E, responsive to the user selecting the interaction "group by," the system updates the list above the input box to present a list of candidate dimensions for the interaction. In FIG. 5F, the system receives user input corresponding to the letter "c." In the list above the input box, the system presents a list of dimensions that include words starting with the letter "c." In FIG. 5G, the system receives additional user input corresponding to the letter "a" and narrows down the list of suggestions to a single candidate dimension, "product category." The system receives user input selecting that dimension for the interaction.

Figure 5H:
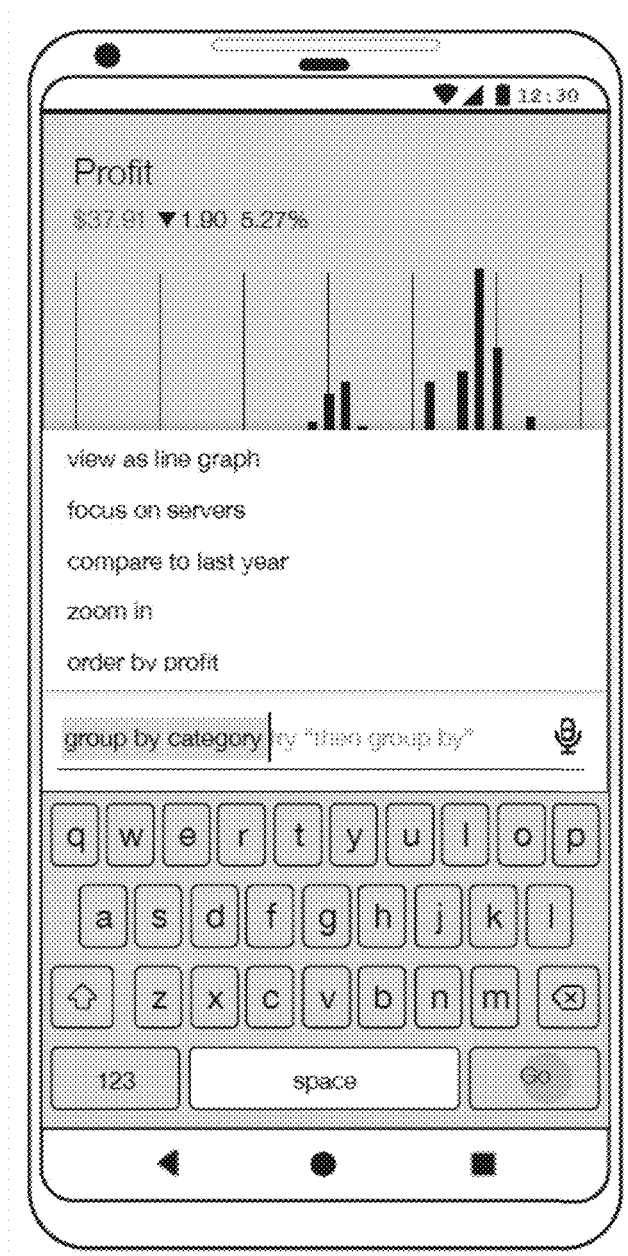
Figure 5I:
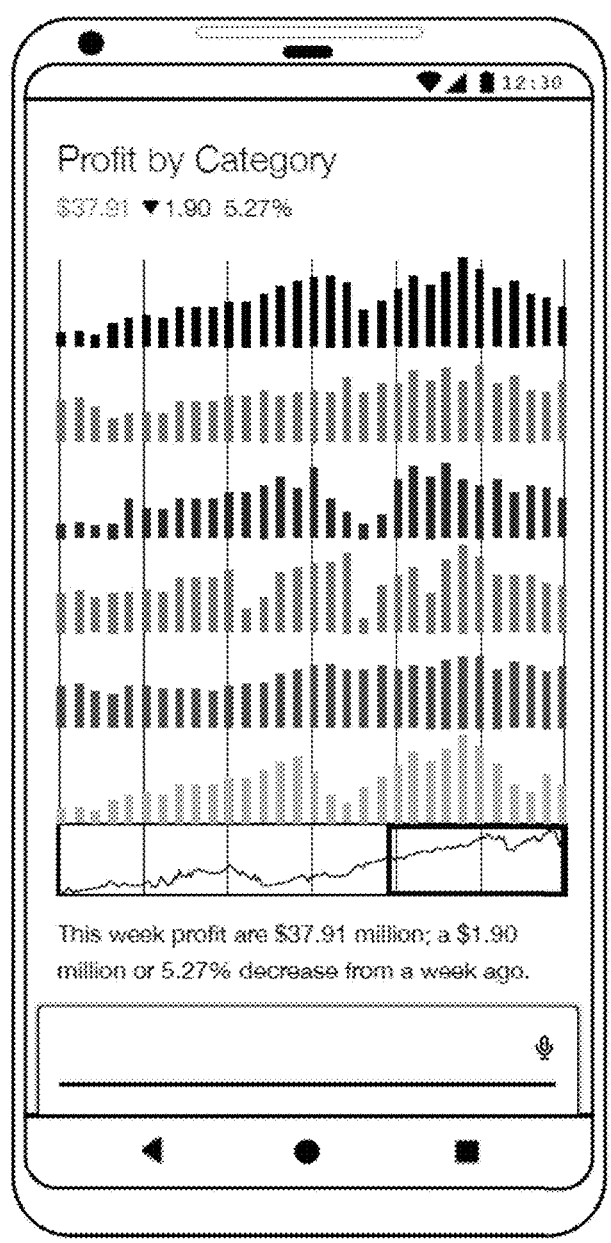

In an embodiment, after receiving user input selecting from one or more candidate subsets, the system allows the user to supply additional user input(s). In FIG. 5H, in the list above the input box, the system supplies additional suggestions to add to the interaction, "group by category." The system does not receive user input selecting any of those options. Instead, the system receives user input selecting "Go," which corresponds to an instruction to perform the interaction. In FIG. 5I, the system presents a modified data visualization based on the user inputs, in which profit is grouped by product category.

Figure 6A:
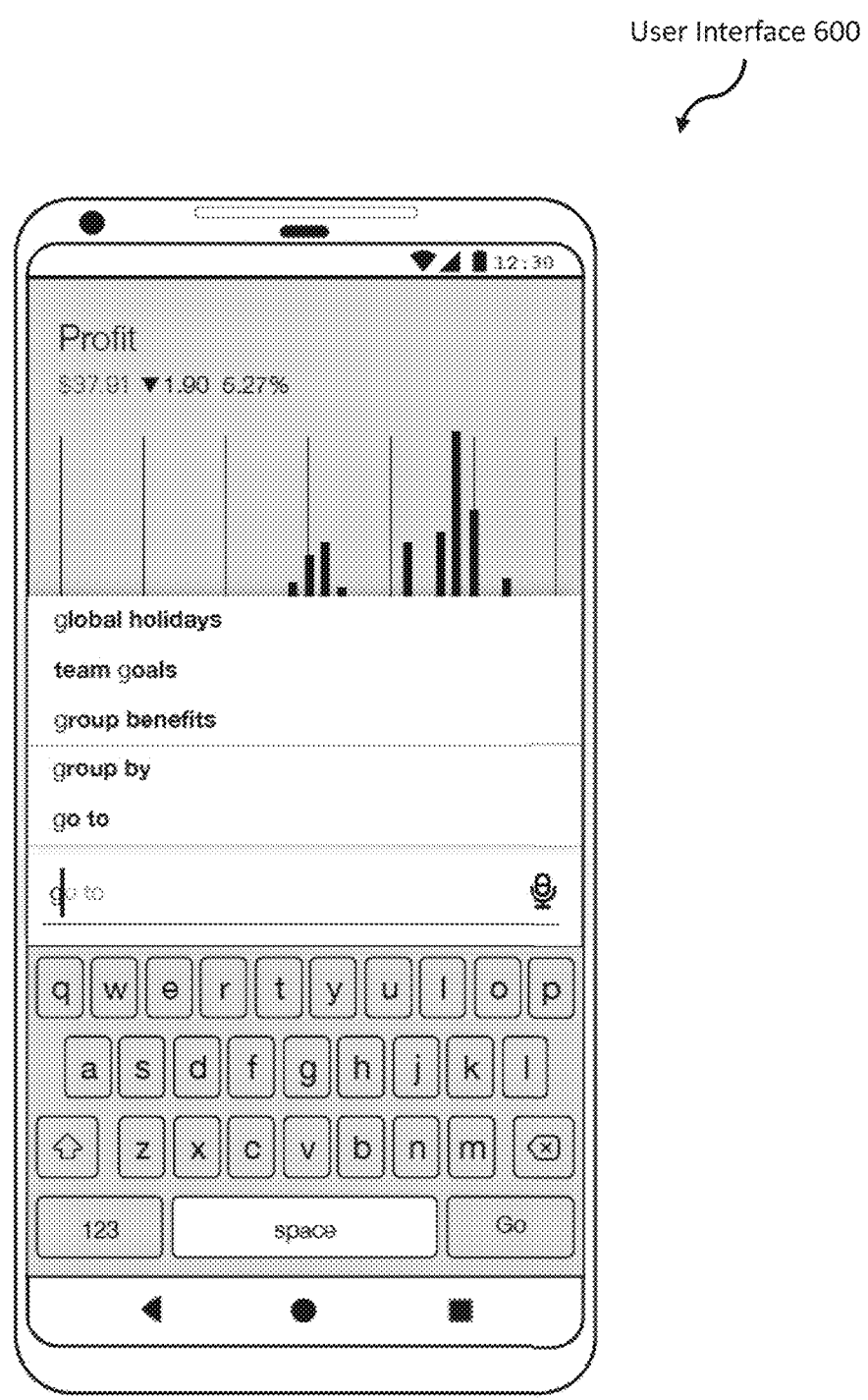
FIGS. 6A-6G illustrate an example in accordance with one or more embodiments.
Figure 6B:
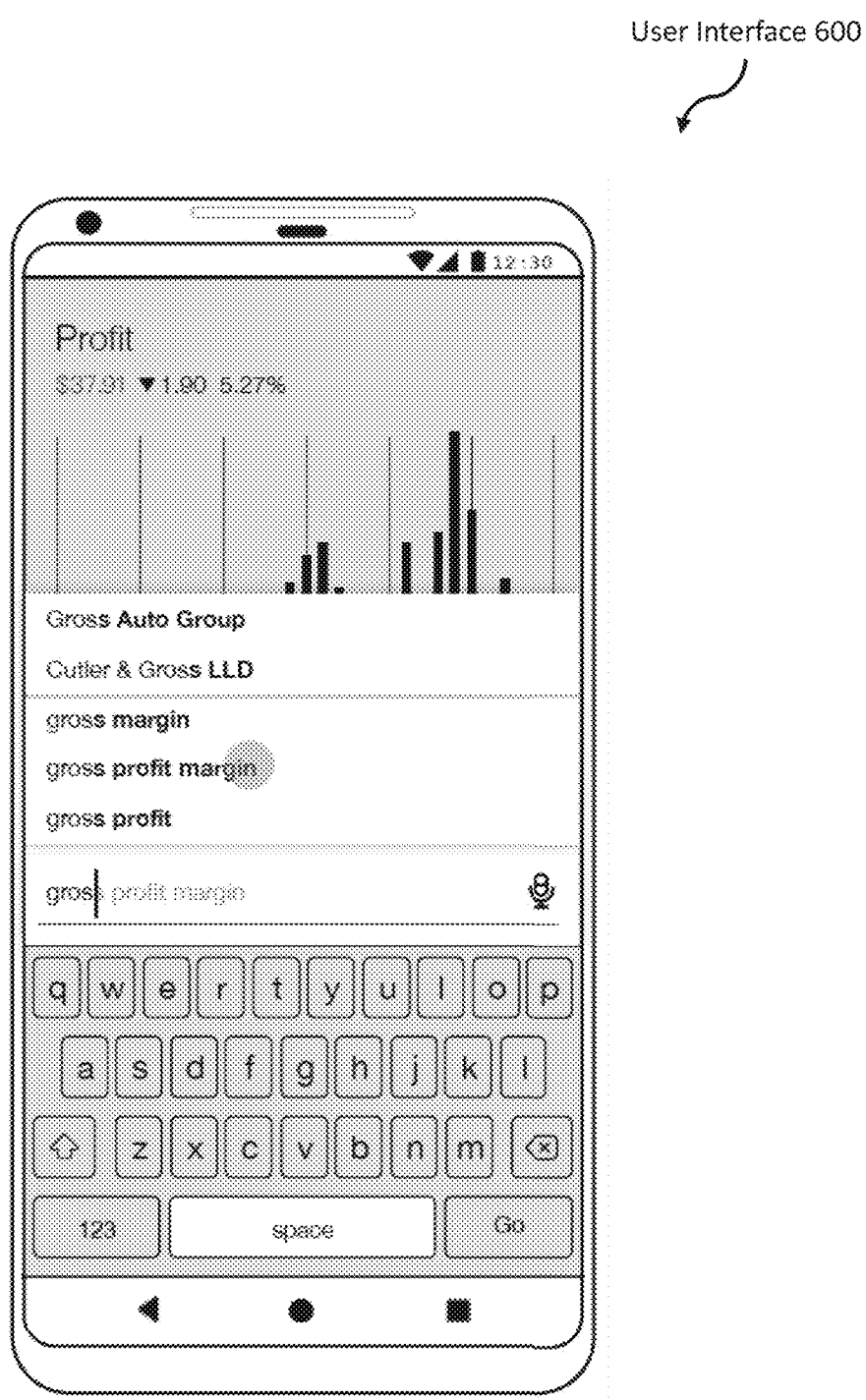
Figure 6C:
Figure 6D:
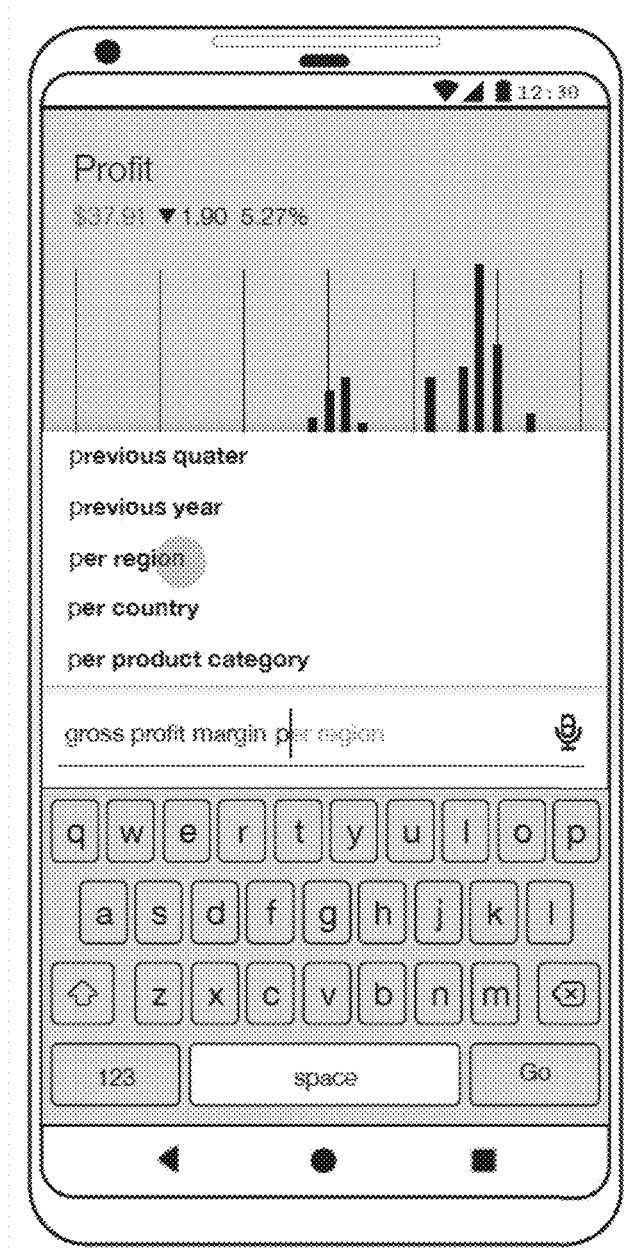
Figure 6E:
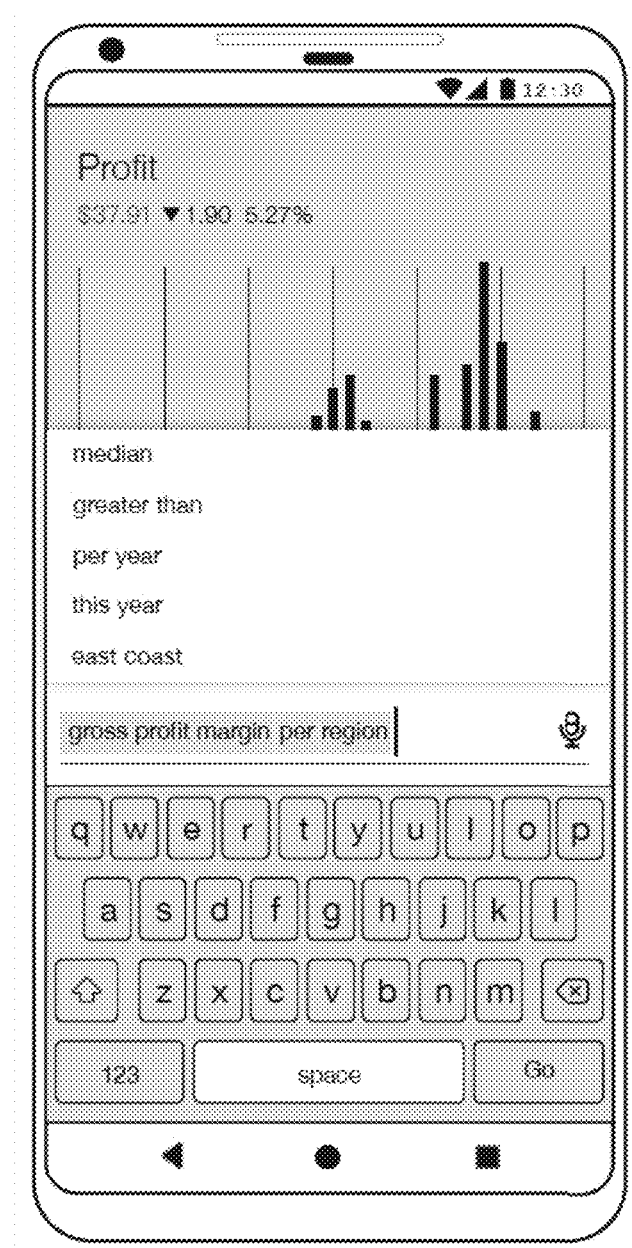
Figure 6F:
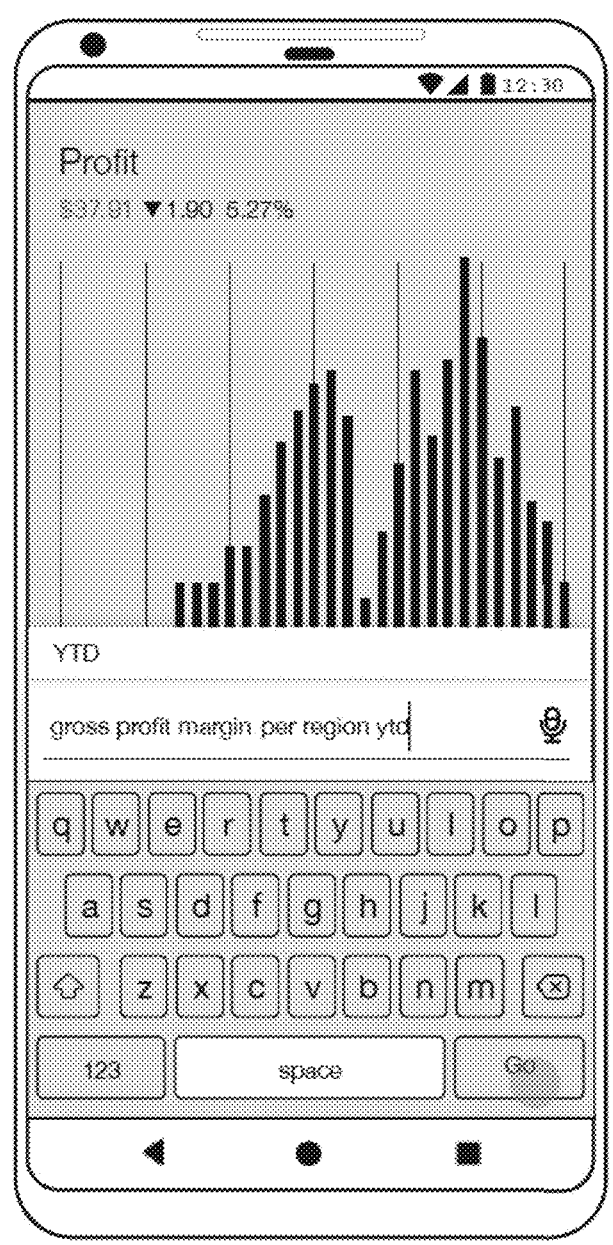
Figure 6G:
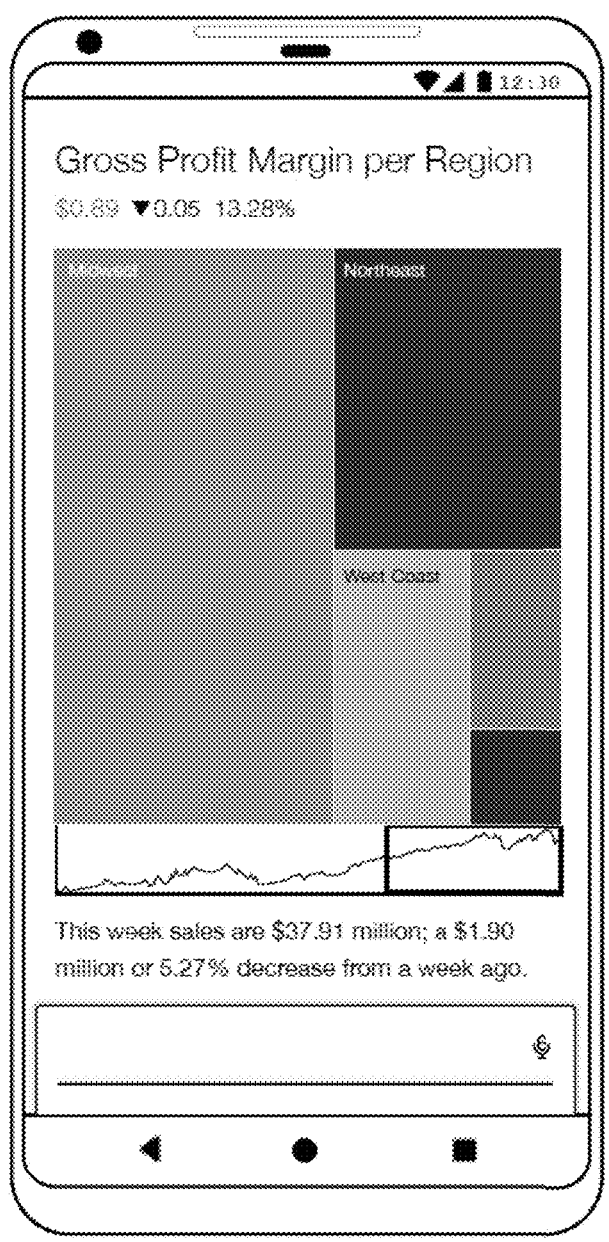

FIGS. 6A-6G illustrate an example in accordance with one or more embodiments. Specifically, FIGS. 6A-6G illustrate an example of language-based manipulation of a data visualization, using a user interface 600 on a mobile device. In FIG. 6A, the user interface 600 presents a data visualization that charts profit over time. The system receives user input corresponding to the letter "g." In the list above the input box, the system presents suggested inputs that have words starting with the letter "g." In this example, the list includes both dimensions ("global holidays," "team goals," and "group benefits") and interactions ("group by" and "go to"). In FIG. 6B, the system receives additional user input corresponding to the letters "ros." In the list above the input box, the system now presents suggested inputs with words that start with the letters "gros." In this example, the revised list includes attributes ("Gross Auto Group" and "Cutler & Gross LLD") and measures ("gross margin," "gross profit margin," and "gross profit"). The system receives user input selecting the measure "gross profit margin." In FIG. 6C, in the list above the input box, the system presents includes additional inputs for aggregating or filtering gross profit margin data. In this example, the suggestions "2018," "North America," and "ABC Inc" are attributes. Responsive to a selection of one of these attributes, the system is configured to present gross profit margin associated with the selected attribute. The options "by region" and "by country"

refer to dimensions. Responsive to a selection of one of these dimensions, the system will present gross profit margin broken down by the selected dimension. In FIG. 6D, the system receives additional user input corresponding to the letter "p." Responsive to the user input, the system presents a different list of suggestions, with words starting with the letter "p." The system receives user input selecting "per region," to break down the gross profit margin data by region. In FIG. 6E, in the list above the input box, the system presents additional options for aggregating or filtering gross profit margin data. Specifically, the system presents options to view a median gross profit margin, only gross profit margins greater than a particular amount, gross profit margins aggregated by year, gross profit margins for this year, or gross profit margins for the east coast region. In FIG. 6F, instead of one of the suggestions, the system receives user input corresponding to the letters "ytd," meaning "year to date." In FIG. 6G, the system presents a modified data visualization, based on the user inputs, in which gross profit margin for the year to date is aggregated by sales region.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

22

6. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

Figure 7:
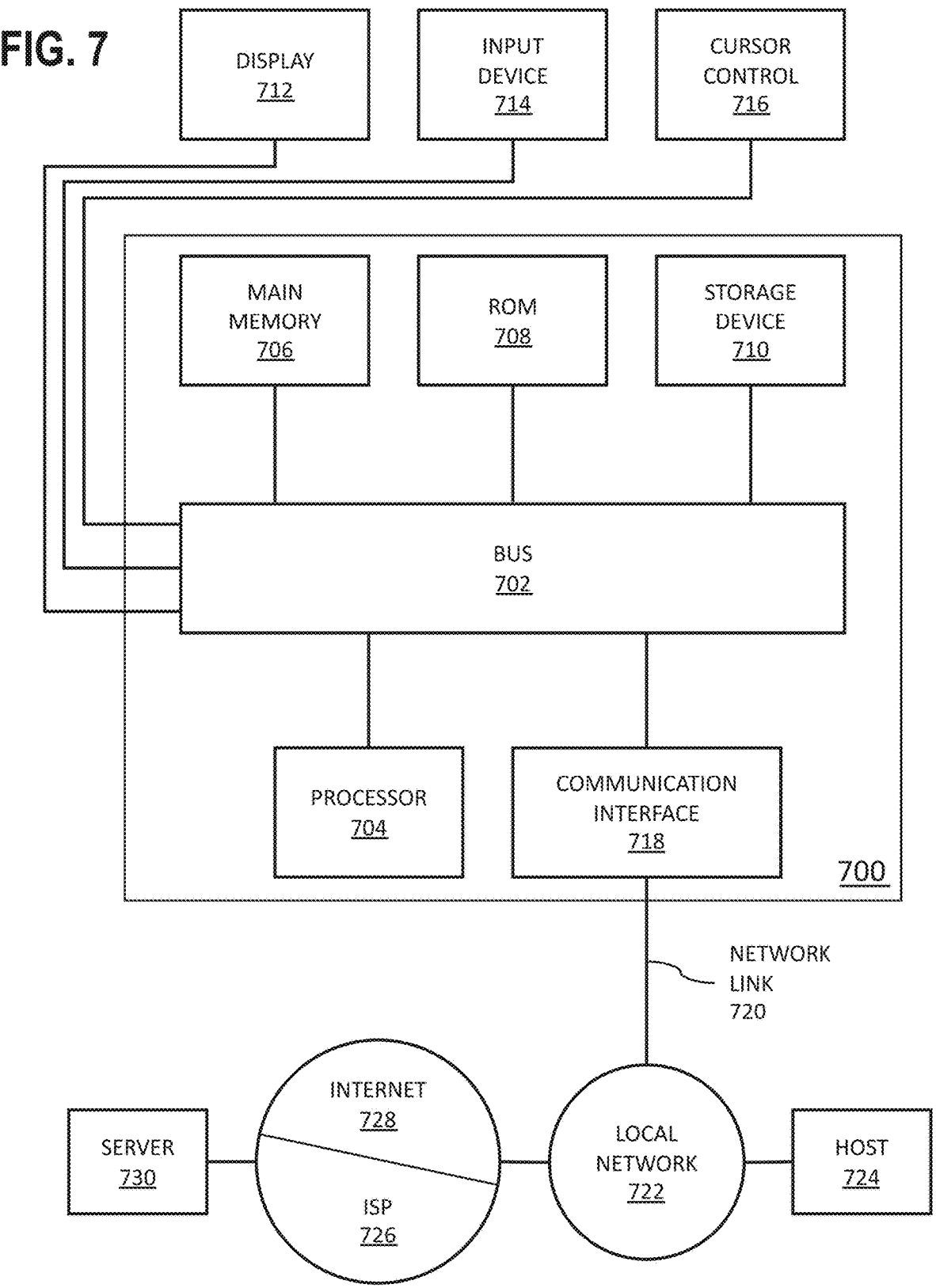
FIG. 7 shows a block diagram that illustrates a computer system in accordance with one or more embodiments.

For example, FIG. 7 is a block diagram that illustrates a computer system 700 upon which an embodiment of the invention may be implemented. Computer system 700 includes a bus 702 or other communication mechanism for communicating information, and a hardware processor 704 coupled with bus 702 for processing information. Hardware processor 704 may be, for example, a general purpose microprocessor.

Computer system 700 also includes a main memory 706, such as a random access memory (RAM) or other dynamic storage device, coupled to bus 702 for storing information and instructions to be executed by processor 704. Main memory 706 also may be used for storing temporary variables or other intermediate information during execution of instructions to be executed by processor 704. Such instructions, when stored in non-transitory storage media accessible to processor 704, render computer system 700 into a special-purpose machine that is customized to perform the operations specified in the instructions.

Computer system 700 further includes a read only memory (ROM) 708 or other static storage device coupled to bus 702 for storing static information and instructions for processor 704. A storage device 710, such as a magnetic disk or optical disk, is provided and coupled to bus 702 for storing information and instructions.

Computer system 700 may be coupled via bus 702 to a display 712, such as a liquid crystal display (LCD), plasma display, electronic ink display, cathode ray tube (CRT) monitor, or any other kind of device for displaying information to a computer user. An input device 714, including alphanumeric and other keys, may be coupled to bus 702 for communicating information and command selections to processor 704. Alternatively or in addition, the computer system 700 may receive user input via a cursor control 716, such as a mouse, a trackball, a trackpad, a touchscreen, or cursor direction keys for communicating direction information and command selections to processor 704 and for controlling cursor movement on display 712. This input device typically has two degrees of freedom in two axes, a first axis (e.g., x) and a second axis (e.g., y), that allows the device to specify positions in a plane. The display 712 may be configured to receive user input via one or more pressure-sensitive sensors, multi-touch sensors, and/or gesture sensors. Alternatively or in addition, the computer system 700 may receive user input via a microphone, video camera, and/or some other kind of user input device (not shown).

Computer system 700 may implement the techniques described herein using customized hard-wired logic, one or more ASICs or FPGAs, firmware and/or program logic which in combination with the computer system causes or programs computer system 700 to be a special-purpose machine. According to one embodiment, the techniques herein are performed by computer system 700 in response to processor 704 executing one or more sequences of one or more instructions contained in main memory 706. Such instructions may be read into main memory 706 from another storage medium, such as storage device 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 710. Volatile media includes dynamic memory, such as main memory 706. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 702. Transmission media can also take the form of acoustic or light waves, such as those generated during radio-wave and infra-red data communications.

Various forms of media may be involved in carrying one or more sequences of one or more instructions to processor 704 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 700 can receive the data from the network and place the data on bus 702. Bus 702 carries the data to main memory 706, from which processor 704 retrieves and executes the instructions. The instructions received by main memory 706 may optionally be stored on storage device 710 either before or after execution by processor 704.

Computer system 700 also includes a communication interface 718 coupled to bus 702. Communication interface 718 provides a two-way data communication coupling to a network link 720 that is connected to a local network 722. For example, communication interface 718 may be an integrated services digital network (ISDN) card, cable modem, satellite modem, or a modem to provide a data communication connection to a corresponding type of telephone line. As another example, communication interface 718 may be a local area network (LAN) card to provide a data communication connection to a compatible LAN. Wireless links may also be implemented. In any such implementation, communication interface 718 sends and receives electrical, electromagnetic or optical signals that carry digital data streams representing various types of information.

Network link 720 typically provides data communication through one or more networks to other data devices. For example, network link 720 may provide a connection through local network 722 to a host computer 724 or to data equipment operated by an Internet Service Provider (ISP) 726. ISP 726 in turn provides data communication services through the world wide packet data communication network now commonly referred to as the "Internet" 728. Local network 722 and Internet 728 both use electrical, electromagnetic or optical signals that carry digital data streams. The signals through the various networks and the signals on network link 720 and through communication interface 718, which carry the digital data to and from computer system 700, are example forms of transmission media.

Computer system 700 can send messages and receive data, including program code, through the network(s), network link 720 and communication interface 718. In the Internet example, a server 730 might transmit a requested code for an application program through Internet 728, ISP 726, local network 722 and communication interface 718.

The received code may be executed by processor 704 as it is received, and/or stored in storage device 710, or other non-volatile storage for later execution.

7. Computer Networks and Cloud Networks

In one or more embodiments, a computer network provides connectivity among a set of nodes running software that utilizes techniques as described herein. The nodes may be local to and/or remote from each other. The nodes are connected by a set of links. Examples of links include a coaxial cable, an unshielded twisted cable, a copper cable, an optical fiber, and a virtual link.

A subset of nodes implements the computer network. Examples of such nodes include a switch, a router, a firewall, and a network address translator (NAT). Another subset of nodes uses the computer network. Such nodes (also referred to as "hosts") may execute a client process and/or a server process. A client process makes a request for a computing service (such as, execution of a particular application, and/or storage of a particular amount of data). A server process responds by executing the requested service and/or returning corresponding data.

A computer network may be a physical network, including physical nodes connected by physical links. A physical node is any digital device. A physical node may be a function-specific hardware device, such as a hardware switch, a hardware router, a hardware firewall, and a hardware NAT. Additionally or alternatively, a physical node may be any physical resource that provides compute power to perform a task, such as one that is configured to execute various virtual machines and/or applications performing respective functions. A physical link is a physical medium connecting two or more physical nodes. Examples of links include a coaxial cable, an unshielded twisted cable, a copper cable, and an optical fiber.

A computer network may be an overlay network. An overlay network is a logical network implemented on top of another network (such as, a physical network). Each node in an overlay network corresponds to a respective node in the underlying network. Hence, each node in an overlay network is associated with both an overlay address (to address to the overlay node) and an underlay address (to address the underlay node that implements the overlay node). An overlay node may be a digital device and/or a software process (such as, a virtual machine, an application instance, or a thread) A link that connects overlay nodes is implemented as a tunnel through the underlying network. The overlay nodes at either end of the tunnel treat the underlying multi-hop path between them as a single logical link. Tunneling is performed through encapsulation and decapsulation.

In an embodiment, a client may be local to and/or remote from a computer network. The client may access the computer network over other computer networks, such as a private network or the Internet. The client may communicate requests to the computer network using a communications protocol, such as Hypertext Transfer Protocol (HTTP). The requests are communicated through an interface, such as a client interface (such as a web browser), a program interface, or an application programming interface (API).

In an embodiment, a computer network provides connectivity between clients and network resources. Network resources include hardware and/or software configured to execute server processes. Examples of network resources include a processor, a data storage, a virtual machine, a container, and/or a software application. Network resources are shared amongst multiple clients. Clients request computing services from a computer network independently of each other. Network resources are dynamically assigned to the requests and/or clients on an on-demand basis. Network resources assigned to each request and/or client may be scaled up or down based on, for example, (a) the computing services requested by a particular client, (b) the aggregated computing services requested by a particular tenant, and/or (c) the aggregated computing services requested of the computer network. Such a computer network may be referred to as a "cloud network."

In an embodiment, a service provider provides a cloud network to one or more end users. Various service models may be implemented by the cloud network, including but not limited to Software-as-a-Service (SaaS), Platform-as-a-Service (PaaS), and Infrastructure-as-a-Service (IaaS). In SaaS, a service provider provides end users the capability to use the service provider's applications, which are executing on the network resources. In PaaS, the service provider provides end users the capability to deploy custom applications onto the network resources. The custom applications may be created using programming languages, libraries, services, and tools supported by the service provider. In IaaS, the service provider provides end users the capability to provision processing, storage, networks, and other fundamental computing resources provided by the network resources. Any applications, including an operating system, may be deployed on the network resources.

In an embodiment, various deployment models may be implemented by a computer network, including but not limited to a private cloud, a public cloud, and a hybrid cloud. In a private cloud, network resources are provisioned for exclusive use by a particular group of one or more entities (the term "entity" as used herein refers to a corporation, organization, person, or other entity). The network resources may be local to and/or remote from the premises of the particular group of entities. In a public cloud, cloud resources are provisioned for multiple entities that are independent from each other (also referred to as "tenants" or "customers"). The computer network and the network resources thereof are accessed by clients corresponding to different tenants. Such a computer network may be referred to as a "multi-tenant computer network." Several tenants may use a same particular network resource at different times and/or at the same time. The network resources may be local to and/or remote from the premises of the tenants. In a hybrid cloud, a computer network comprises a private cloud and a public cloud. An interface between the private cloud and the public cloud allows for data and application portability. Data stored at the private cloud and data stored at the public cloud may be exchanged through the interface. Applications implemented at the private cloud and applications implemented at the public cloud may have dependencies on each other. A call from an application at the private cloud to an application at the public cloud (and vice versa) may be executed through the interface.

In an embodiment, tenants of a multi-tenant computer network are independent of each other. For example, one tenant (through operation, tenant-specific practices, employees, and/or identification to the external world) may be separate from another tenant. Different tenants may demand different network requirements for the computer network. Examples of network requirements include processing speed, amount of data storage, security requirements, performance requirements, throughput requirements, latency requirements, resiliency requirements, Quality of Service (QoS) requirements, tenant isolation, and/or consistency. The same computer network may need to implement different network requirements demanded by different tenants.

In one or more embodiments, in a multi-tenant computer network, tenant isolation is implemented to ensure that the applications and/or data of different tenants are not shared with each other. Various tenant isolation approaches may be used.

In an embodiment, each tenant is associated with a tenant ID. Each network resource of the multi-tenant computer network is tagged with a tenant ID. A tenant is permitted access to a particular network resource only if the tenant and the particular network resources are associated with a same tenant ID.

In an embodiment, each tenant is associated with a tenant ID. Each application, implemented by the computer network, is tagged with a tenant ID. Additionally or alternatively, each data structure and/or dataset, stored by the computer network, is tagged with a tenant ID. A tenant is permitted access to a particular application, data structure, and/or dataset only if the tenant and the particular application, data structure, and/or dataset are associated with a same tenant ID.

As an example, each database implemented by a multi-tenant computer network may be tagged with a tenant ID. Only a tenant associated with the corresponding tenant ID may access data of a particular database. As another example, each entry in a database implemented by a multi-tenant computer network may be tagged with a tenant ID. Only a tenant associated with the corresponding tenant ID may access data of a particular entry. However, the database may be shared by multiple tenants.

In an embodiment, a subscription list indicates which tenants have authorization to access which applications. For each application, a list of tenant IDs of tenants authorized to access the application is stored. A tenant is permitted access to a particular application only if the tenant ID of the tenant is included in the subscription list corresponding to the particular application.

In an embodiment, network resources (such as digital devices, virtual machines, application instances, and threads) corresponding to different tenants are isolated to tenant-specific overlay networks maintained by the multi-tenant computer network. As an example, packets from any source device in a tenant overlay network may only be transmitted to other devices within the same tenant overlay network. Encapsulation tunnels are used to prohibit any transmissions from a source device on a tenant overlay network to devices in other tenant overlay networks. Specifically, the packets, received from the source device, are encapsulated within an outer packet. The outer packet is transmitted from a first encapsulation tunnel endpoint (in communication with the source device in the tenant overlay network) to a second encapsulation tunnel endpoint (in communication with the destination device in the tenant overlay network). The second encapsulation tunnel endpoint decapsulates the outer packet to obtain the original packet transmitted by the source device. The original packet is transmitted from the second encapsulation tunnel endpoint to the destination device in the same particular overlay network.

8. Microservice Applications

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The techniques described above may be encapsulated into a microservice, according to one or more embodiments. In other words, a microservice may trigger a notification (into the microservices manager for optional use by other plugged in applications, herein referred to as the "target" microservice) based on the above techniques and/or may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in microservice application detects that a threshold is crossed. For example, a user may request a trigger into the microservices manager when the microservice application detects a value has crossed a triggering threshold.

In one embodiment, the trigger, when satisfied, might output data for consumption by the target microservice. In another embodiment, the trigger, when satisfied, outputs a binary value indicating the trigger has been satisfied, or outputs the name of the field or other context information for which the trigger condition was satisfied. Additionally or alternatively, the target microservice may be connected to one or more other microservices such that an alert is input to the other micro services. Other microservices may perform responsive actions based on the above techniques, including, but not limited to, deploying additional resources, adjusting system configurations, and/or generating GUIs.

Actions

In one or more embodiments, a plugged-in microservice application may expose actions to the microservices manager. The exposed actions may receive, as input, data or an identification of a data object or location of data, that causes data to be moved into a data cloud.

In one or more embodiments, the exposed actions may receive, as input, a request to increase or decrease existing alert thresholds. The input might identify existing in-application alert thresholds and whether to increase or decrease, or delete the threshold. Additionally or alternatively, the input might request the microservice application to create new in-application alert thresholds. The in-application alerts may trigger alerts to the user while logged into the application, or may trigger alerts to the user using default or user-selected alert mechanisms available within the microservice application itself, rather than through other applications plugged into the microservices manager. In one or more embodiments, the microservice application may generate and provide an output based on input that identifies, locates, or provides historical data, and defines the extent or scope of the requested output. The action, when triggered, causes the microservice application to provide, store, or display the output, for example, as a data model or as aggregate data that describes a data model.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory machine-readable media storing instructions which, when executed by one or more processors, cause:

presenting, via a graphical user interface on a screen of a computing device, a data visualization that represents a multidimensional data set comprising a plurality of dimensions, wherein each dimension in the plurality of dimensions comprises, respectively, one or more attributes from a plurality of attributes in the multidimensional data set;

receiving, in an input box of the graphical user interface, first user input comprising language associated with a particular interaction with the data visualization, wherein the particular interaction is configured to manipulate, in the data visualization, presentation of one or more subsets of the multidimensional data set, wherein the first user input does not identify any particular subset of the multidimensional data set;

determining that metadata, associated with the data visualization presented in the graphical user interface, indicates at least that a particular subset of the multidimensional data set is represented in the data visualization;

based on the metadata indicating at least that the particular subset of the multidimensional data set is represented in the data visualization: selecting the particular subset of the multidimensional data set as a candidate for the particular interaction;

presenting on the graphical user interface, as a candidate subset for the particular interaction, the particular subset of the multidimensional data set;

receiving, via the graphical user interface, second user input selecting the particular subset of the multidimensional data set presented on the graphical user interface for the particular interaction;

generating, based at least on the first user input and the second user input, a complete command corresponding to the particular interaction with the data visualization;

based on the complete command: performing the particular interaction to manipulate, in the data visualization presented on the graphical user interface, presentation of the particular subset of the multidimensional data set.

2. The one or more non-transitory machine-readable media of claim 1, further storing instructions which, when executed by one or more processors, cause:
generating a query based on the complete command, wherein performing the particular interaction comprises applying the query to the multidimensional data set.

3. The one or more non-transitory machine-readable media of claim 1, wherein performing the particular interaction is performed without querying the multidimensional data set.

4. The one or more non-transitory machine-readable media of claim 1, further storing instructions which, when executed by one or more processors, cause:
determining, based on an interaction vocabulary, that the language of the first input maps to the particular action.

5. The one or more non-transitory machine-readable media of claim 1, wherein determining that the particular interaction is applicable to the two or more candidate subsets of the multidimensional data set comprises:
determining that the two or more candidate subsets of the multidimensional data set are displayed in the data visualization.

6. The one or more non-transitory machine-readable media of claim 1, wherein determining that the particular interaction is applicable to the two or more candidate subsets of the multidimensional data set comprises:
determining that the two or more candidate subsets of the multidimensional data set are represented in metadata associated with the data visualization.

7. The one or more non-transitory machine-readable media of claim 1, wherein determining that the particular interaction is applicable to the two or more candidate subsets of the multidimensional data set comprises:
determining, based at least on the context of the first user input, that the particular interaction is applicable to the particular type of data in the multidimensional data set;
determining that the two or more candidate subsets of the multidimensional data set are of the particular type.

8. The one or more non-transitory machine-readable media of claim 1, wherein the first user input comprises one or more of voice input or text input, supplied to a mobile data analytics application operating on a mobile device.

9. The one or more non-transitory machine-readable media of claim 1, wherein the particular interaction shows all attributes of a particular dimension in the modified data visualization, and the two or more candidate subsets of the multidimensional data set are dimensions of the multidimensional data set.

10. The one or more non-transitory machine-readable media of claim 1, wherein the particular interaction aggregates data in the modified data visualization by a particular dimension, and the two or more candidate subsets of the multidimensional data set are dimensions of the multidimensional data set.

11. The one or more non-transitory machine-readable media of claim 1, wherein the particular interaction sorts data in the modified data visualization by a particular dimension, and the two or more candidate subsets of the multidimensional data set are dimensions of the multidimensional data set.

12. The one or more non-transitory machine-readable media of claim 1, wherein the particular interaction highlights a particular attribute in the modified data visualization, and the two or more candidate subsets of the multidimensional data set are attributes in the multidimensional data set.

13. The one or more non-transitory machine-readable media of claim 1, wherein the particular interaction removes all attributes other than a targeted attribute in the data visualization, and the two or more candidate subsets of the multidimensional data set are attributes in the multidimensional data set.

14. The one or more non-transitory machine-readable media of claim 13, wherein the particular attribute is associated with a particular dimension in the plurality of dimensions, and wherein the particular interaction further presents one or more sub-attributes of the particular attribute that are associated with a subdimension of the particular dimension.

15. The one or more non-transitory machine-readable media of claim 13, wherein before performing the particular interaction, the data visualization presents data associated with an attribute that is different from the particular attribute.

16. The one or more non-transitory machine-readable media of claim 1, wherein the particular interaction presents a comparison of data associate with two or more particular attributes in the data visualization, and the two or more candidate subsets of the multidimensional data set are attributes in the multidimensional data set.

17. The one or more non-transitory machine-readable media of claim 1, wherein the particular interaction presents data in the modified data visualization according to a particular measure, and the two or more candidate subsets of the multidimensional data set are measures in the multidimensional data set.

18. The one or more non-transitory machine-readable media of claim 1, further storing instructions which, when executed by one or more processors, cause:
determining, based on an interaction vocabulary, that the language of the first input maps to the particular action,
wherein performing the particular interaction is performed without querying the multidimensional data set,
wherein the first user input comprises one or more of voice input or text input, supplied to a mobile data analytics application operating on a mobile device,
wherein the two or more candidate subsets of the multidimensional data set are one or more of:
dimensions of the multidimensional data set; attributes of the multidimensional data set; or measures of the multidimensional data set.

19. A method comprising:
presenting, via a graphical user interface on a screen of a computing device, a data visualization that represents a multidimensional data set comprising a plurality of dimensions, wherein each dimension in the plurality of dimensions comprises, respectively, one or more attributes from a plurality of attributes in the multidimensional data set;

receiving, in an input box of the graphical user interface, first user input comprising language associated with a particular interaction with the data visualization,
wherein the particular interaction is configured to manipulate, in the data visualization, presentation of one or more subsets of the multidimensional data set,
wherein the first user input does not identify any particular subset of the multidimensional data set;

determining that metadata, associated with the data visualization presented in the graphical user interface, indicates at least that a particular subset of the multidimensional data set is represented in the data visualization;

based on the metadata indicating at least that the particular subset of the multidimensional data set is represented in the data visualization: selecting the particular subset of the multidimensional data set as a candidate for the particular interaction;

presenting on the graphical user interface, as a candidate subset for the particular interaction, the particular subset of the multidimensional data set;

receiving, via the graphical user interface, second user input selecting the particular subset of the multidimensional data set presented on the graphical user interface for the particular interaction;

generating, based at least on the first user input and the second user input, a complete command corresponding to the particular interaction with the data visualization;

based on the complete command: performing the particular interaction to manipulate, in the data visualization presented on the graphical user interface, presentation of the particular subset of the multidimensional data set, wherein the method is performed by at least one device comprising a hardware processor.

20. A system comprising:
at least one device including a hardware processor;
the system being configured to perform operations comprising:
presenting, via a graphical user interface on a screen of a computing device, a data visualization that represents a multidimensional data set comprising a plurality of dimensions, wherein each dimension in the plurality of dimensions comprises, respectively, one or more attributes from a plurality of attributes in the multidimensional data set;

receiving, in an input box of the graphical user interface, first user input comprising language associated with a particular interaction with the data visualization,
wherein the particular interaction is configured to manipulate, in the data visualization, presentation of one or more subsets of the multidimensional data set,
wherein the first user input does not identify any particular subset of the multidimensional data set;

determining that metadata, associated with the data visualization presented in the graphical user interface, indicates at least that a particular subset of the multidimensional data set is represented in the data visualization;

based on the metadata indicating at least that the particular subset of the multidimensional data set is represented in the data visualization: selecting the particular subset of the multidimensional data set as a candidate for the particular interaction;

presenting on the graphical user interface, as a candidate subset for the particular interaction, the particular subset of the multidimensional data set;

receiving, via the graphical user interface, second user input selecting the particular subset of the multidimensional data set presented on the graphical user interface for the particular interaction;

generating, based at least on the first user input and the second user input, a complete command corresponding to the particular interaction with the data visualization;

based on the complete command: performing the particular interaction to manipulate, in the data visualization presented on the graphical user interface, presentation of the particular subset of the multidimensional data set.

21. The one or more non-transitory machine-readable media of claim 1, further comprising:
determining that the metadata further indicates a second subset of the multidimensional data set is represented in the data visualization;
based on the metadata indicating that the second subset of the multidimensional data set is represented in the data visualization: selecting the second subset of the multidimensional data set as a second candidate for the particular interaction;
wherein the presenting further comprises presenting, as a second candidate subset for the particular interaction, the second subset of the multidimensional data set.

* * * * *